United States Patent
Fujita et al.

(10) Patent No.: US 8,502,890 B2
(45) Date of Patent: Aug. 6, 2013

(54) SWITCHER CONTROL DEVICE, SWITCHER CONTROL METHOD, AND IMAGE SYNTHESIZING APPARATUS

(75) Inventors: Shinichi Fujita, Kanagawa (JP); Sensaburo Nakamura, Shizuoka (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 12/589,435

(22) Filed: Oct. 23, 2009

(65) Prior Publication Data
US 2010/0118164 A1  May 13, 2010

(30) Foreign Application Priority Data
Nov. 11, 2008 (JP) ............................... P2008-288719

(51) Int. Cl.
*H04N 5/262* (2006.01)
(52) U.S. Cl.
USPC ..................................... 348/239; 348/240.99
(58) Field of Classification Search
USPC ............... 348/239, 333.01–333.13, 284, 143, 348/240.99
See application file for complete search history.

(56) References Cited

U.S. PATENT DOCUMENTS

| | | | |
|---|---|---|---|
| 7,595,834 B2 * | 9/2009 | Kawai et al. | 348/333.02 |
| 2001/0026319 A1 * | 10/2001 | Honey et al. | 348/169 |
| 2004/0249861 A1 * | 12/2004 | Hoshino et al. | 707/104.1 |
| 2005/0134716 A1 * | 6/2005 | Vice | 348/333.02 |
| 2007/0110336 A1 * | 5/2007 | Arakawa | 382/294 |
| 2007/0268392 A1 * | 11/2007 | Paalasmaa et al. | 348/333.02 |
| 2011/0012912 A1 * | 1/2011 | Nakamura et al. | 345/582 |
| 2011/0199484 A1 * | 8/2011 | Uchihara | 348/143 |

FOREIGN PATENT DOCUMENTS

JP  04-157882 A  5/1992

* cited by examiner

*Primary Examiner* — Aung S Moe
(74) *Attorney, Agent, or Firm* — Sony Corporation

(57) ABSTRACT

A switcher control device includes: a superimposition determining unit that determines whether a superimposition image is superimposed on an image taken by a camera based on angle information and zoom value information about the camera in selecting a camera image when an effects switcher selects the image taken by the camera as a background image; and a switcher instructing unit that instructs the effects switcher to superimpose the superimposition image based on a determined result of the superimposition determining unit.

14 Claims, 27 Drawing Sheets

FIG.12

| No | Start Time | Time Scale | Script | Story Name | | | | | |
|---|---|---|---|---|---|---|---|---|---|
| | Event Title | | Duration | Video | Key | Audio1 | Audio2 | BGM | |
| S | 00:00:00 | | | START | | | | | |
| 1 | 00:00:00 | | 00:00 | | | | | | |
| 2 | 00:00:00 | | 00:00 | | | | Opening | | |
| 1 | OTS | | 00:00 | Mix / Mix 0.5 SEC. | SVR / News Top3 | | Today's News Top3 | SV | |

464B

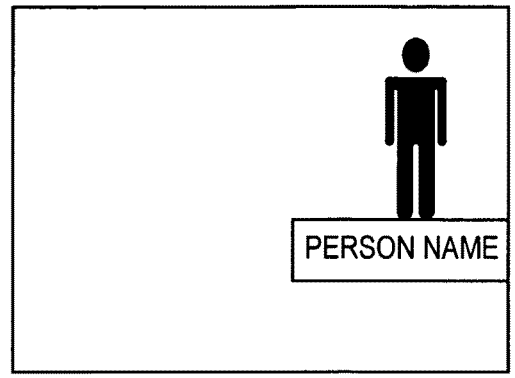
FIG.14A IMAGE OF CAMERA 1
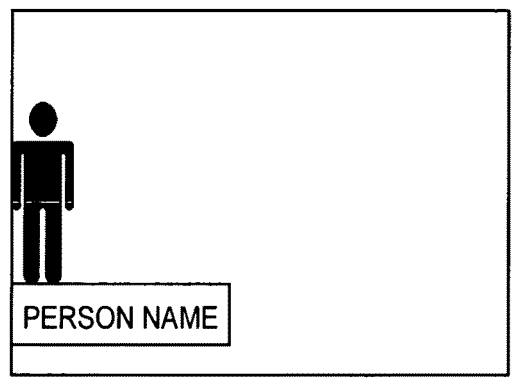
FIG.14B IMAGE OF CAMERA 2
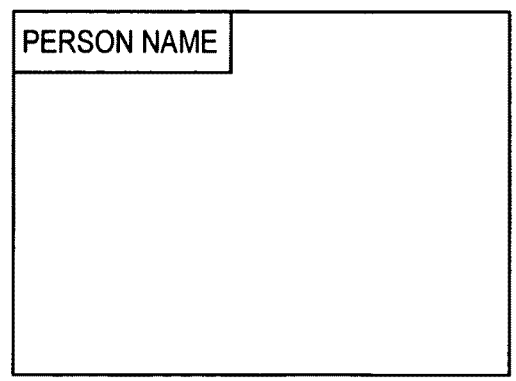
FIG.14C SUPERIMPOSITION IMAGE

ILLUSTRATION OF SHOOTING AREA (IMAGE FRAME)

ILLUSTRATION OF ZOOM VALUE

ILLUSTRATION OF TARGET POSITIONS IN PICTURE AREA

FIG.21

EXEMPLARY DETAILS OF PLAYLIST INCLUDING SUPERIMPOSITION SETTINGS TO TARGET POSITION

PORTION RELATED TO CERTAIN M/E IN PLAYLIST

EFFECTS, DURATION, AND OTHERS

| NUMBER | COMPONENT NAME | M/E COMPONENTS ||||||| TRANSITION DETAILS |
|---|---|---|---|---|---|---|---|---|
| | | Bkgd A | Bkgd B | Key1 | Key1 Control | Key2 | Key2 Control | |
| 1 | RELAYED BROADCAST 1 | IMAGE OF STUDIO CAMERA 1 | STADIUM IMAGE | COMMENTARY SUBTITLES | (SETTING DATA A) | CAST 1 SUPERIMPOSED | (SETTING DATA C) (POSITION INFORMATION 1) | CUT |
| 2 | STUDIO 1 | STADIUM IMAGE | IMAGE OF STUDIO CAMERA 1 | COMMENTARY SUBTITLES | (SETTING DATA A) | (NOT AVAILABLE) | (NOT AVAILABLE) | Wipe 3 30Frames |
| 3 | RELAYED BROADCAST 2 | IMAGE OF STUDIO CAMERA 1 | IMAGE OF STUDIO CAMERA 2 | CM TEXT | (SETTING DATA B) | CAST 2 SUPERIMPOSED | (SETTING DATA D) (POSITION INFORMATION 2) | MIX 10Frames |
| 4 | RELAYED BROADCAST 3 | IMAGE OF STUDIO CAMERA 2 | IMAGE OF STUDIO CAMERA 1 | CAST 1 SUPERIMPOSED | (SETTING DATA C) (POSITION INFORMATION 1) | (NOT AVAILABLE) | (NOT AVAILABLE) | CG 7 50Frames |

EXEMPLARY DELIVERY CONTROL BY CONTROLLER

FIG.24

| CAMERA NUMBER | CAMERA IMAGE INPUT NUMBER | SUPERIMPOSITION IMAGE INPUT NUMBER | KEYER | KEY CONTROL | TARGET POSITION INFORMATION |
|---|---|---|---|---|---|
| 1 | 3 | 22 | 1 | (CONTROL VALUE 1) | (POSITION INFORMATION 1) |
| 2 | 4 | 23 | 1 | (CONTROL VALUE 2) | (POSITION INFORMATION 2) |
| 3 | 7 | 27 | 1 | (CONTROL VALUE 3) | (POSITION INFORMATION 3) |

EXEMPLARY DELIVERY CONTROL BY CONTROLLER

EXEMPLARY POSITIONS FOR SUPERIMPOSING IMAGE

SWITCHER CONTROL DEVICE, SWITCHER CONTROL METHOD, AND IMAGE SYNTHESIZING APPARATUS

CROSS-REFERENCE TO RELATED APPLICATION

The present application claims priority from Japanese Patent Application No. JP 2008-288719 filed in the Japanese Patent Office on Nov. 11, 2008, the entire content of which is incorporated herein by reference.

BACKGROUND OF THE INVENTION

1. Field of the Invention

The present invention relates to a switcher control device, a switcher control method, and an image synthesizing apparatus. More specifically, the invention relates to a switcher control device in which when an effects switcher selects an image taken by a camera as a background image, the switcher control device determines whether a superimposition image is superimposed on the image taken by the camera based on angle information and zoom value information about the camera, and instructs the effects switcher to do superimposition, thereby economically implementing superimposition according to shooting states without causing degradation of the overall functions.

2. Description of the Related Art

In a relayed broadcast such as a sports broadcast, in order to represent descriptions of a stadium and players, or comments made by commentators, graphics such as subtitles and lines are sometimes superimposed in the picture area of the relayed broadcast. Superimposition of subtitles is a classic technique having been conducted. However, the positions of players are changing every moment, and it is necessary to make graphics drawings for commentary as matched with the image at that moment.

A CG (Computer Graphics) device is used for creating such superimposition images, and the process of superimposing computer graphics on a relayed image is often conducted by a studio device called an effects switcher. In the effects switcher, a circuit that handles superimposing images is called a keyer. In the effects switcher, a plurality of keyers is generally provided.

Heretofore, for operating live broadcasting, a large number of staffs is manned such as camera operators, CG device operators, effects switcher operators, audio mixer operators, image material editors, and an administrator to switch news. In recent years, such a technique has been developed that a single computer system controls a variety of types of devices for labor savings.

JP-A-H04-157882 (Patent Document 1) describes a technique that when the pan, tilt and zoom values of a camera fall in a predetermined condition, character information and graphics information stored in advance are superimposed on an image taken by the camera.

SUMMARY OF THE INVENTION

In a broadcasting system, it becomes common that processes such as selection and superimposition of images and special effects are processed by a device such as an effects switcher in a concentrated manner. For example, it can be considered that application of the technique described in Patent Document 1 in which character information and graphics information are superimposed on the image taken by the camera, a portion of the circuit in the effects switcher is exclusively used. In this case, even though any images taken by the camera are not used, it is difficult to allocate that portion of the circuit for other purposes, which causes degradation of the overall functions.

For example, it can be considered that in application of the technique described in Patent Document 1 in which character information and graphics information are superimposed on the image taken by the camera, it can be considered that a superimposition device for cameras is provided separately from the effects switcher. In this case, although the use of the image taken by the camera is involved in only a small portion of operations, this takes a lot of money.

Thus, it is desirable to economically implement superimposition according to the shooting state of a camera without causing degradation of the overall functions in relation to a system using an effects switcher. In addition, it is also desirable to automate adjusting of the position at which an image is superimposed, to downsize the staff necessary to operate a broadcasting system to curtail costs, and to reduce the possibilities of occurrence of operating error caused by manual operations of superimposed positions. In addition, it is also desirable to economically implement suited superimposition in operations of a plurality of cameras.

An embodiment of the invention is directed to an image synthesizing apparatus including: a camera; an effects switcher that synthesizes an image; and a control unit that controls an operation of the effects switcher, wherein when the effects switcher selects an image taken by the camera as a background image, the control unit determines whether a superimposition image is superimposed on the image taken by the camera based on angle information and zoom value information about the camera, and instructs the effects switcher to superimpose the superimposition image based on the determined result.

In the embodiment of the invention, the effects switcher synthesizes an image. The operation of the effects switcher is controlled by the control unit. The image taken by the camera is selected by the effects switcher as a background image, for example.

When the effects switcher selects the image taken by the camera as a background image, the control unit determines whether a superimposition image is superimposed on the image taken by the camera based on angle information (directions of pan and tilt) and zoom value information about the camera. For example, when a target is included in the image taken by the camera, it is determined that a superimposition image is to be superimposed. Here, for example, when a target is a person, a superimposition image is the person's name.

For determining whether a target is included in the image taken by the camera, target position information and camera position information are used, for example, in addition to angle information and zoom value information about the camera. In this case, when the camera is a movable camera, information about the moved position of the camera is used.

In the control unit (switcher control device), the effects switcher is instructed to superimpose a superimposition image based on the determined result. For example, when a plurality of cameras exists, the control unit holds information about a superimposition image that is to be superimposed on each of the images taken by the individual cameras. In this case, when the effects switcher selects an image taken by a predetermined camera among a plurality of the cameras, the effects switcher is instructed to superimpose a superimposition image that is to be placed on the image taken by the predetermined camera.

The control unit controls the operation of the effects switcher based on a broadcast programming delivery program (cue sheet=playlist), for example. Then, the broadcast programming delivery program stores therein an instruction in which when the effects switcher selects the image taken by the camera as a background image, the effects switcher is instructed to superimpose the superimposition image based on information about a shooting state of the camera (such as the position, the angle, and the zoom value).

As described above, in the embodiment of the invention, when the effects switcher selects an image taken by a camera as a background image, the control unit automatically determines whether a superimposition image is to be superimposed, and instructs the effects switcher to do superimposition based on the determined result. In this case, in order to superimpose the superimposition image on the image taken by the camera, a portion of the circuit in the effects switcher is not exclusively used, the portion of the circuit is used as necessary. In addition, in this case, a superimposition device for cameras is not provided separately from the effects switcher. Therefore, superimposition according to the shooting state of the camera can be economically implemented without causing degradation of the overall functions.

In addition, in the embodiment of the invention, when the effects switcher selects an image taken by a predetermined camera among a plurality of the cameras, it is determined whether a superimposition image is superimposed on the image taken by the camera based on information about the shooting state of the predetermined camera (such as the position, the angle, and the zoom value). Then, the effects switcher is instructed to superimpose a superimposition image that is to be placed on the image taken by the predetermined camera based on the determined result. Therefore, even though a plurality of the cameras is operating, suited superimposition can be economically implemented.

In the embodiment of the invention, for example, the control unit may further calculate a position at which a superimposition image is to be superimposed based on angle information and zoom value information about the camera, and based on the calculated result, the control unit may instruct the effects switcher of the position at which the superimposition image is to be superimposed. In this case, because adjusting the superimposed position of the image is automated, the staff necessary to operate a broadcasting system can be downsized to curtail costs, and the possibilities of occurrence of operating error caused by manual operations of superimposed positions can be reduced.

BRIEF DESCRIPTION OF THE DRAWINGS

FIG. 12 is a diagram depicting a playlist in which SVR is set;

FIGS. 14A to 14C are diagrams illustrative of superimposition on images taken by cameras;

FIG. 21 is a diagram depicting exemplary details of a playlist (cue sheet) including settings of superimposition on the target position;

FIG. 24 is a diagram depicting an exemplary superimposition setting table;

DESCRIPTION OF THE PREFERRED EMBODIMENTS

Hereinafter, the best mode for implementing an embodiment of the invention (hereinafter, referred to as an "embodiment") will be described. In addition, the descriptions will be provided in the order below.

1. Embodiment
2. Exemplary modification

1. Embodiment

Figure 1:
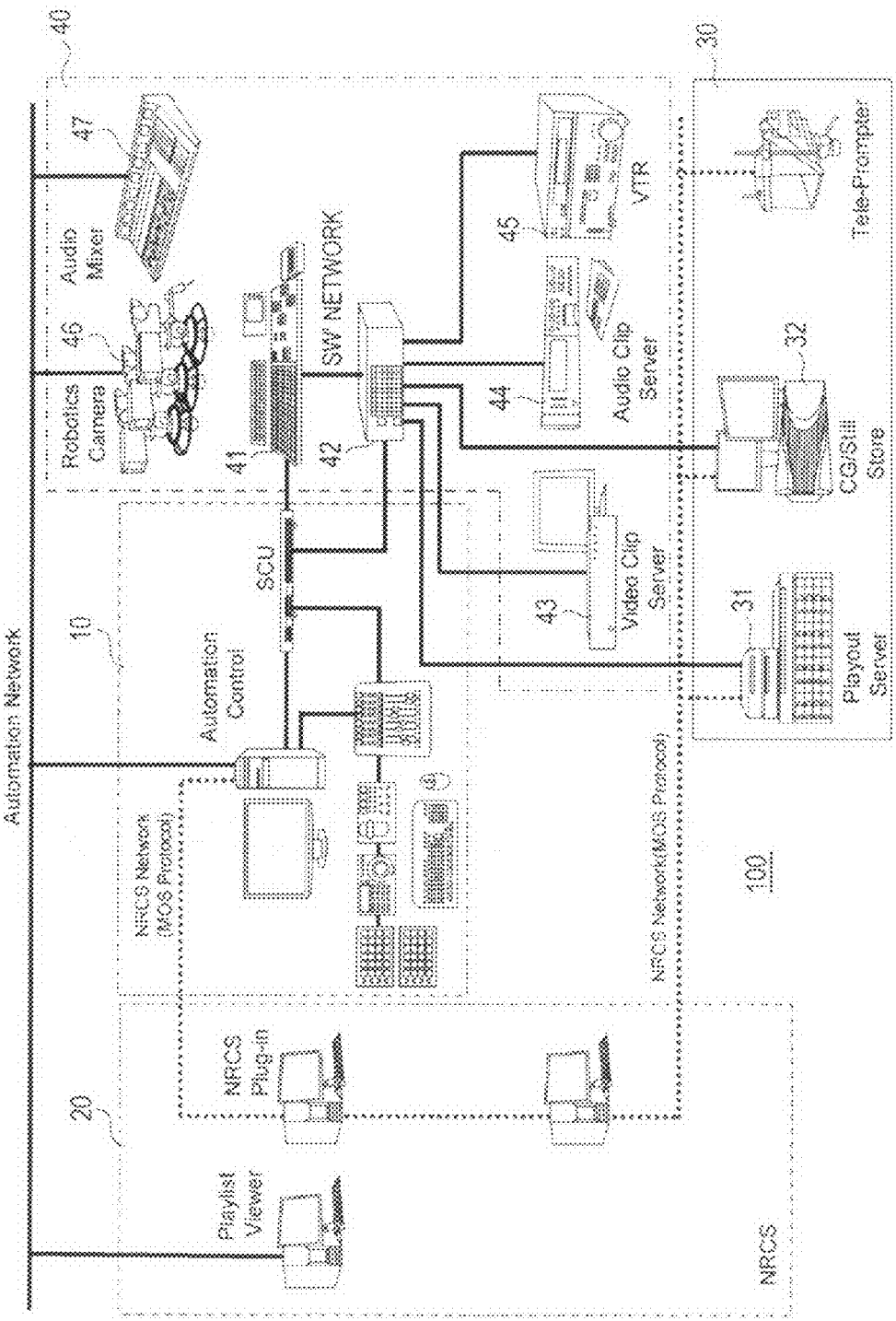
FIG. 1 is a block diagram depicting an exemplary configuration of a broadcast programming delivery control system as an embodiment of the invention.

1-1. Exemplary Configuration of a Broadcast Programming Delivery Control System FIG. 1 shows an exemplary configuration of a broadcast programming delivery control system 100 as an embodiment. This broadcast programming delivery control system 100 has an automation control block 10, a news room control system (NRCS) block 20, an MOS device block 30, and an automation control device block 40.

The control block 10 controls broadcast programming delivery based on a playlist (cue sheet) formed of a plurality of configurations. Here, the playlist configures a broadcast programming delivery program, and individual cues (individual formations) of the playlist correspond to individual items of the broadcast programming delivery program. The NRCS block 20 conducts management and administration related to news programs such as arrangements for gathering information, placing orders of materials, and making formations of broadcast programming. In the MOS (Media Object Server) device block 30, a playout server 31, a CG/still store 32, and other units are arranged, which are networked to the NRCS block 20 (according to MOS Protocol). In the control device block 40, a switcher 41, a device control unit (DCU) 42, a video clip server 43, and an audio clip server 44 are arranged, which are connected to the control block 10. In addition, in the control device block 40, a video tape recorder (VTR) 45, a robotics camera (Robotics Camera) 46, and an audio mixer 47 are arranged.

The NRCS block 20 is connected to the control block and to the MOS device block 30 through an NRCS network according to the MOS protocol. The MOS protocol is a protocol for remotely controlling a video system server installed in a news room from the NRCS, and allowed to have original extended tags based on XML (Extensible Markup Language).

On an NRCS client, an automation plug-in (NRCS Plug-in) and a playlist viewer are installed. To the individual MOS devices in the MOS device block 30, the device control unit 42 in the automation control device block 40 issues an on-air timing by triggers such as Tally/GPI.

Here, the playout server 31 is a video server that stores materials changed and replaced everyday, which is demanded to have advanced functions because the playout server is used for editing. In addition, the playout server 31 has playlists and a MOS interface. It is necessary that the playout server 31 quickly conducts feeding and editing materials, and thus a server of higher performance than that of the video clip server 43 is often used for the playout server 31. In addition, depending on types of the playout server 31, because it is difficult to continuously use the same channel for outputting different materials, channel assignment control in consideration of this point is necessary.

Figure 2:
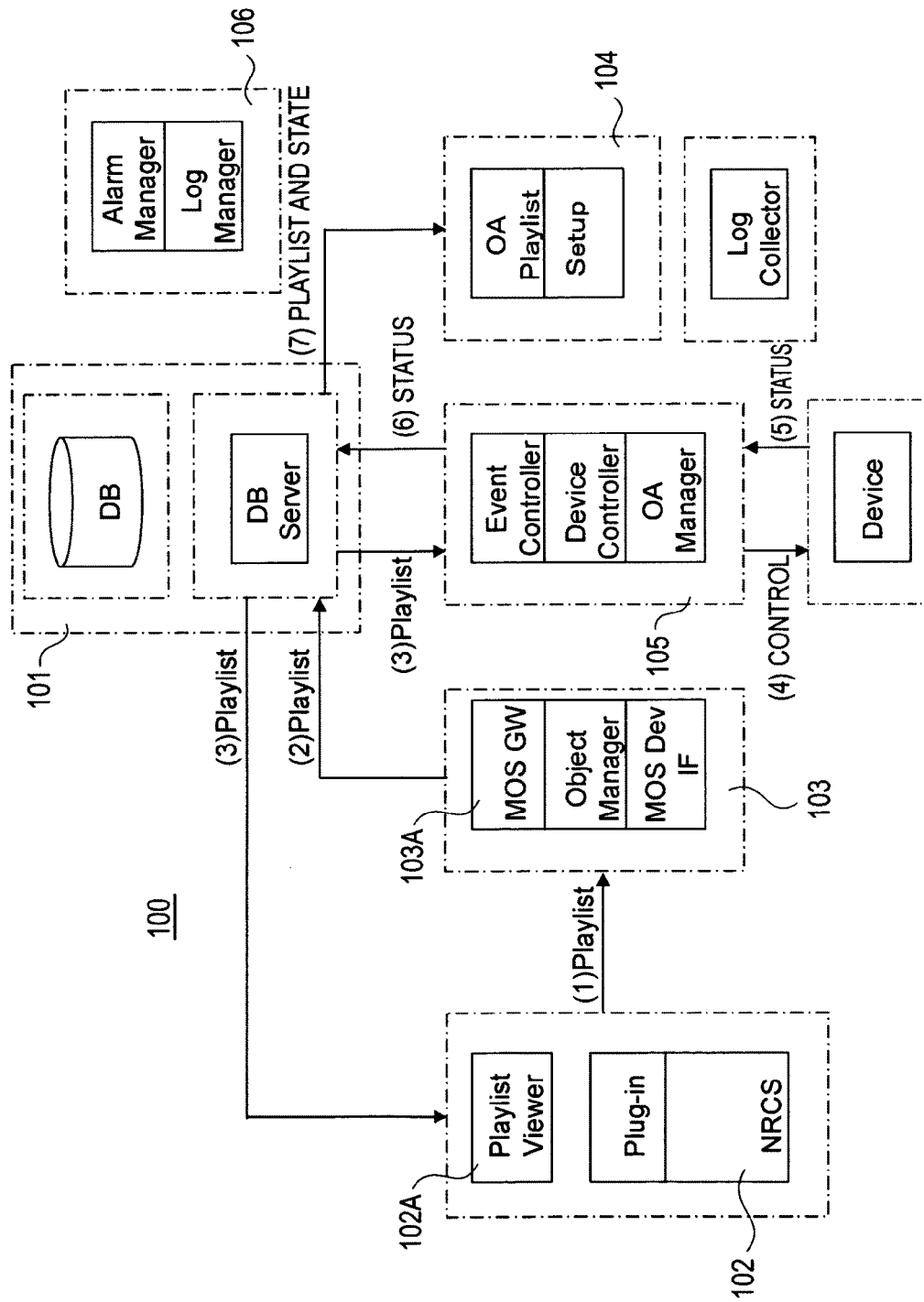
FIG. 2 is a diagram depicting an exemplary configuration of software blocks of the broadcast programming delivery control system.

1-2. Exemplary Configuration of Software Blocks of the Broadcast Programming Delivery Control System FIG. 2 shows an exemplary configuration of software blocks of the broadcast programming delivery control system 100. In other words, the broadcast programming delivery control system 100 has a database (DB) unit 101, an NRCS plug-in/playlist viewer unit 102, and an NRCS interface (NRCS IF) unit 103. In addition, the broadcast programming delivery control system 100 has an on-air playlist/setup unit 104, a device controller unit 105, and a log/alarm manager unit 106. In the broadcast programming delivery control system 100, the individual units construct an automation system.

Automation is TDA (Technical Director Assist) software on a computer unit, which controls devices including the switcher under the NRCS. On the other hand, a server in the automation system also has playlists. Generally, a producer (P) produces an overall news program, and a technical director (TD) conducts the assignment and setting of devices in individual stories in the program. It is the automation system that assists the technical director to control devices. The playlist is a list that holds the detail of progress of a news program in a time series.

In the automation system, playlist data is created by the NRCS of the NRCS plug-in/playlist viewer unit 102 (1), and through a MOS gateway (MOS GW) 103A of an NRCS interface unit 103, the playlist data is sent to the database unit 101 (2). Then, the playlist data is stored in a database (DB) of the database unit 101.

The playlist data is displayed on a playlist viewer (Playlist Viewer) 102A of the NRCS plug-in/playlist viewer unit 102, and sent to a device control unit 105 when a program is on the air (3). The devices are controlled to go on the air in accordance with the playlist (4), and the device statuses are notified to the database (DB) of the database unit 101 (5) and (6). Then, the playlist and the device statuses are sent to the on-air playlist/setup unit 104, and displayed (7). A log or warning is generated in the automation system, and sent to the log/alarm manager unit 106.

1-3. Exemplary Implementation of the Software Blocks of the Broadcast Programming Delivery Control System The individual software blocks in the automation system can be split and installed into individual personal computers for each software block, and a scalable system can be offered as matched with customer's system resizes.

Figure 3:
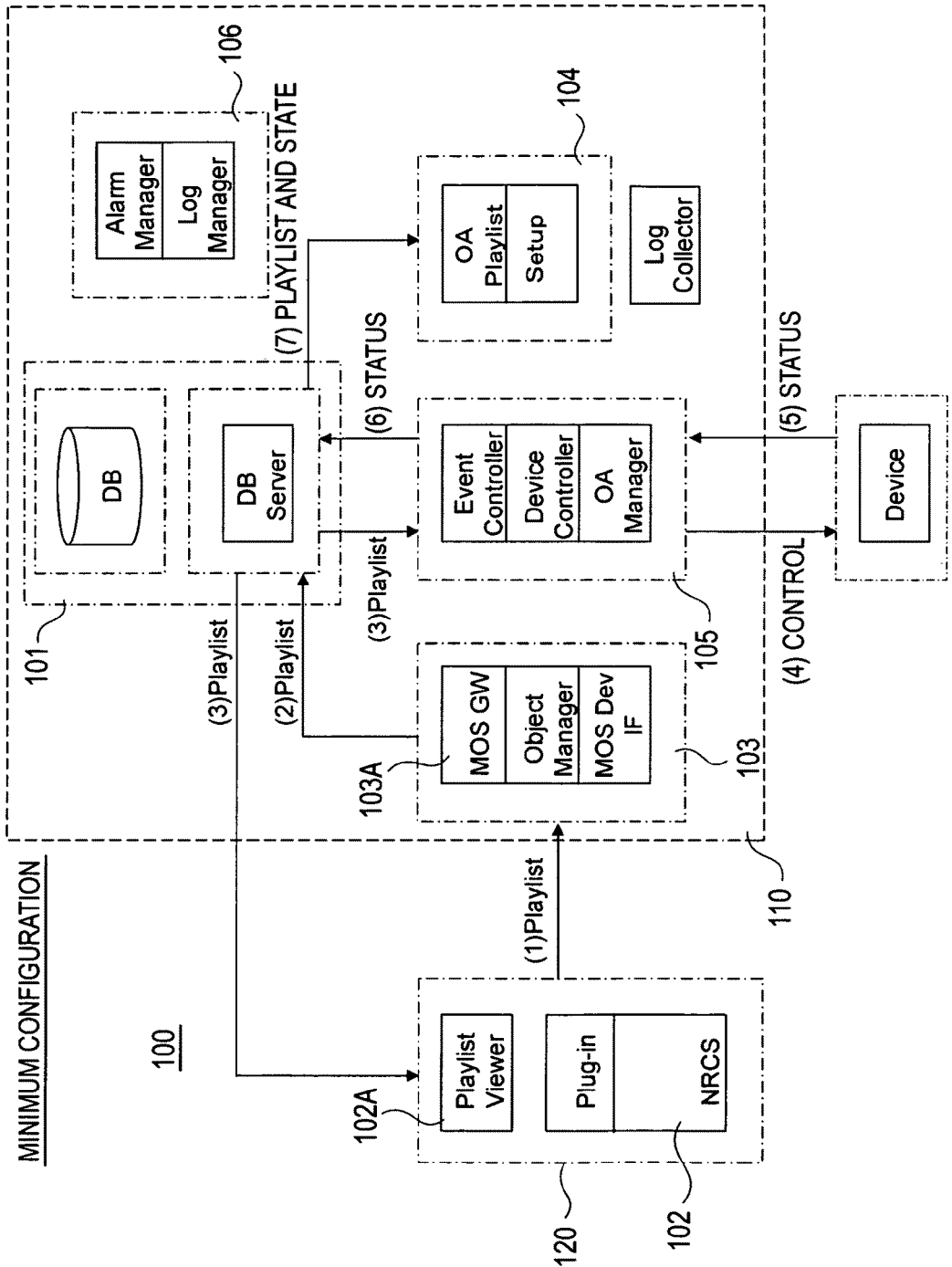
FIG. 3 is a diagram depicting an exemplary implementation of the software blocks of the broadcast programming delivery control system.

FIG. 3 shows an exemplary implementation of the software blocks of the broadcast programming delivery control system 100. In this exemplary implementation, the database unit 101, the NRCS interface unit 103, the on-air playlist/setup unit 104, the device control unit 105, and the log/alarm manager unit 106 are installed in a single computer unit 110. In addition, the NRCS plug-in/playlist viewer unit 102 is installed in a customer's computer unit 120 in which an NRCS client is installed.

Figure 4:
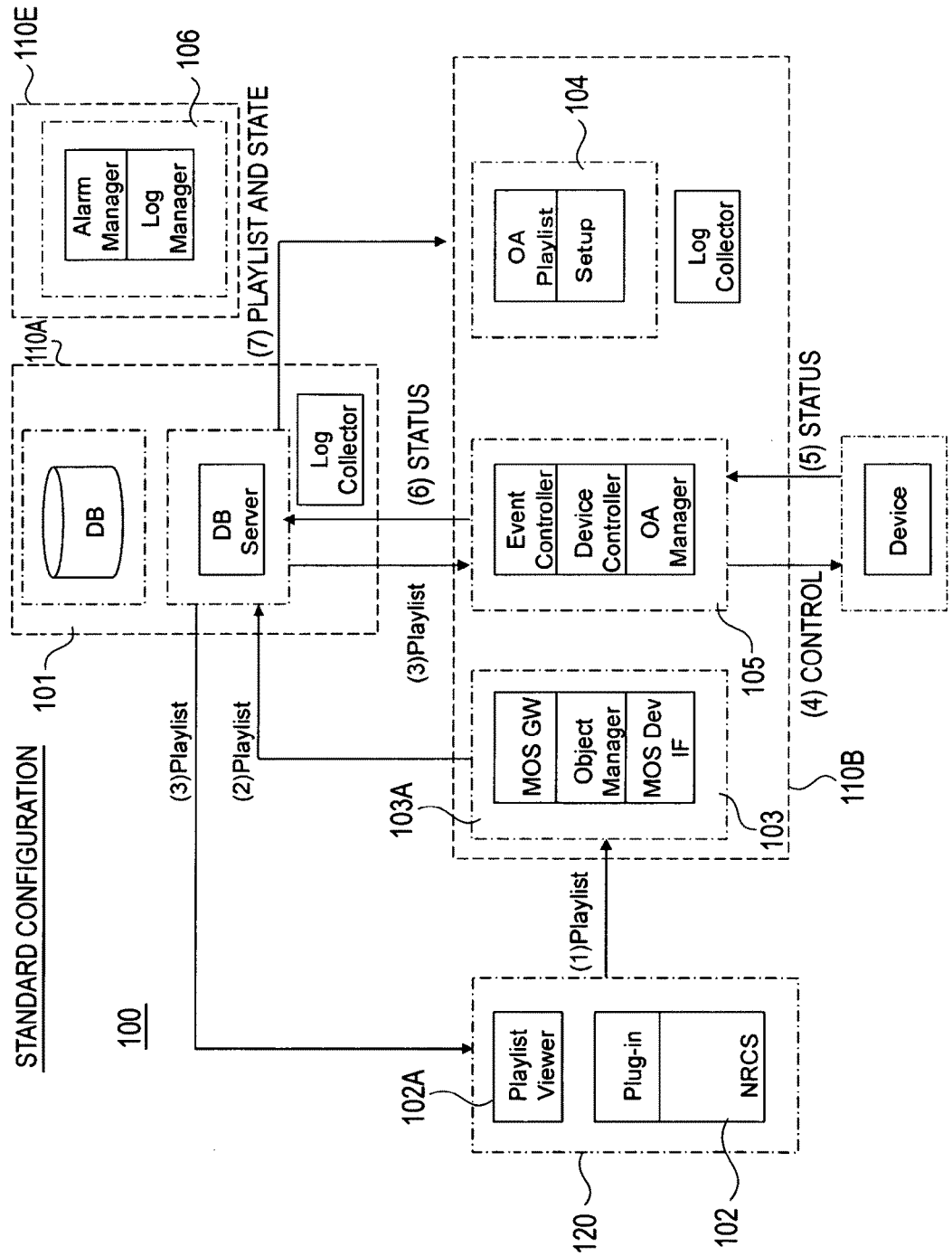
FIG. 4 is a diagram depicting another exemplary implementation of the software blocks of the broadcast programming delivery control system.

FIG. 4 shows another exemplary implementation of the software blocks of the broadcast programming delivery control system 100. In this exemplary implementation, the database unit 101 is installed in a single computer unit 110A. In addition, the log/alarm manager unit 106 is installed in a different computer unit 110E. Moreover, the NRCS interface unit 103, the on-air playlist/setup unit 104, and the device control unit 105 are installed in a different computer unit 110B. In addition, the NRCS plug-in/playlist viewer unit 102 is installed in the customer's computer unit 120 in which the NRCS client is installed.

Figure 5:
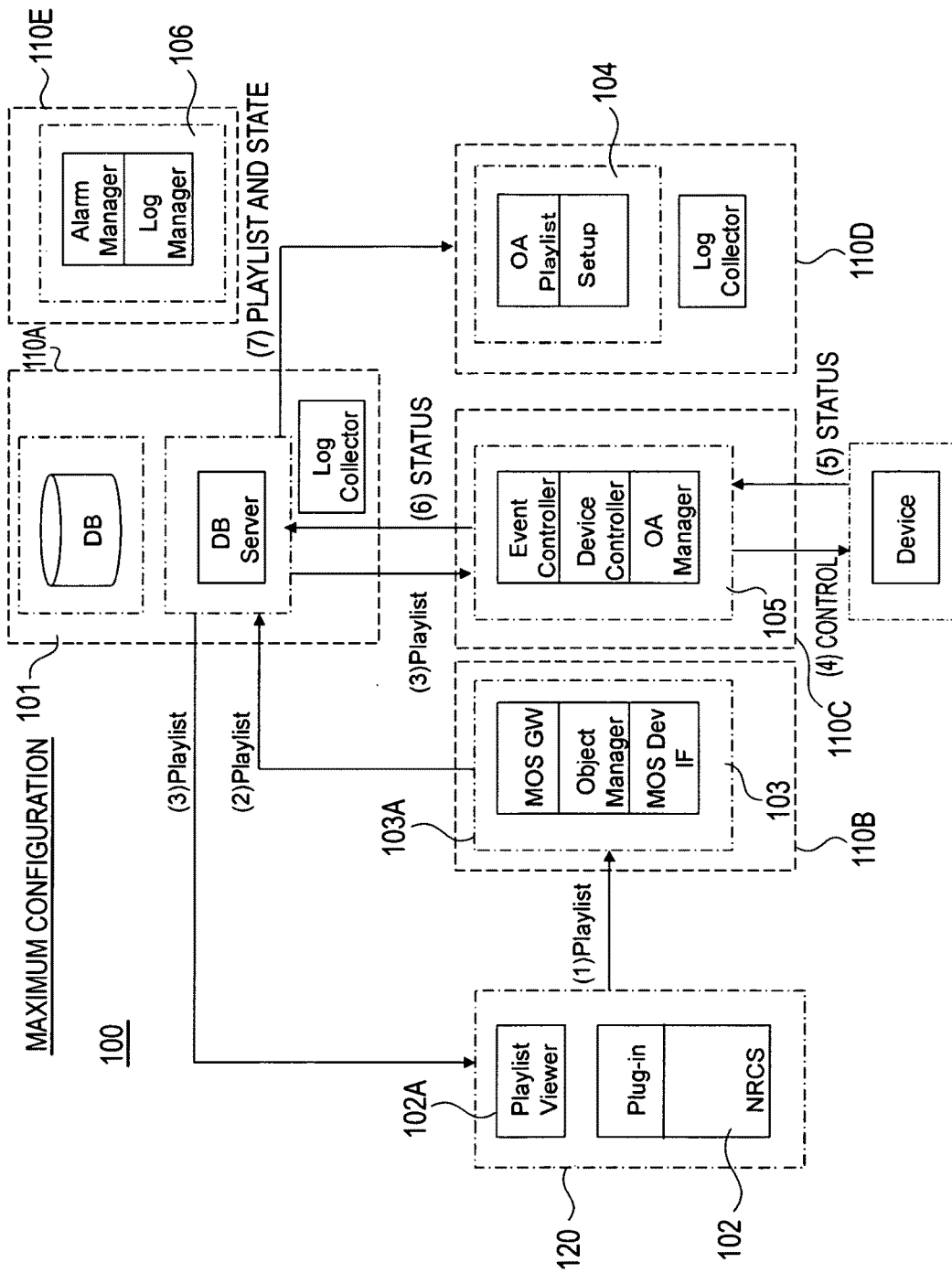
FIG. 5 is a diagram depicting still another exemplary implementation of the software blocks of the broadcast programming delivery control system.

FIG. 5 shows still another exemplary implementation of the software blocks of the broadcast programming delivery control system 100. In this exemplary implementation, the database unit 101 is installed in a single computer unit 110A. In addition, the log/alarm manager unit 106 is installed in a different computer unit 110E. Moreover, the NRCS interface unit 103, the on-air playlist/setup unit 104, and the device control unit 105 are installed in separate computer units 110B, 110C, and 110D. In addition, the NRCS plug-in/playlist viewer unit 102 is installed in the customer's computer unit 120 in which the NRCS client is installed.

As discussed above, the log/alarm manager unit 106 is installed in the standalone computer unit 110E, whereby independence can be provided to detection of abnormal systems. In addition, the database unit 101 is installed in the standalone computer unit 110E, whereby the degree of freedom can be provided to the database system configuration.

Figure 6:
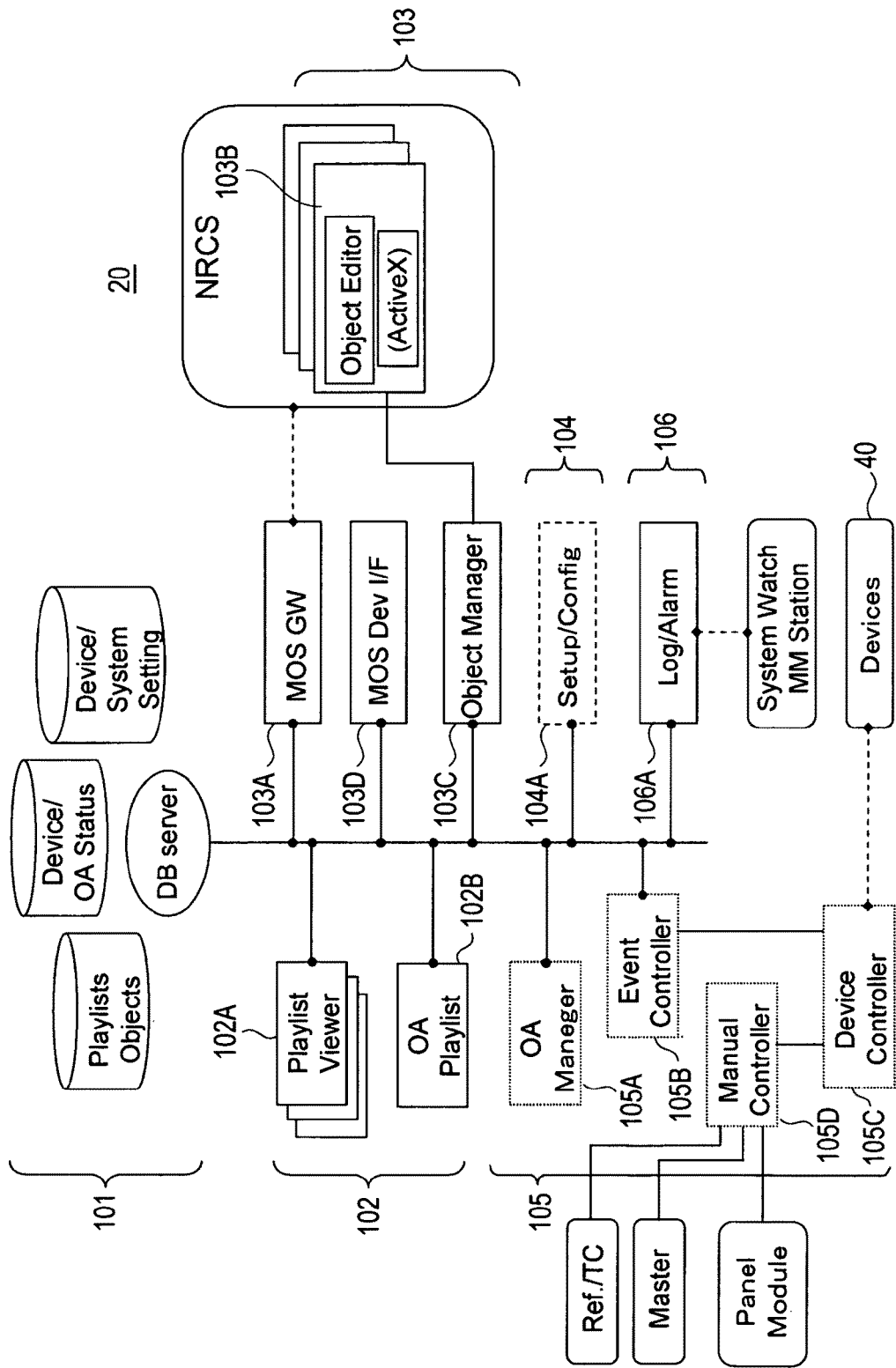
FIG. 6 is a diagram depicting an exemplary block configuration of a database server (DB Server) of a database unit and units around the DB server in an automation system.

1-4. Detailed Block Configuration of the Database Server and Units Around It Here, the detailed block configuration of the database server (DB Server) of the database unit 101 and units around it in the automation system will be described. FIG. 6 shows an exemplary block configuration of the database server and units around it.

The NRCS interface unit 103 includes the MOS gateway (MOS GW) 103A, an object editor (Object Editor) 103B, an object manager (Object Manager) 103C, and a MOS device interface (MOS Device I/F) 103D.

The MOS gateway 103A communicates with the NRCS block 20 according to the MOS protocol, and updates the database unit 101. In other words, the MOS gateway 103A receives a RUNDOWN (Running Order) from the NRCS block, and converts the RUNDOWN into a playlist and writes it in the database unit 101.

The object editor 103B makes setting to objects of devices connected to the automation system. Here, the devices connected to the automation system are the switcher 41, the audio mixer 47, the robotics camera 46, the video clip server 43, and other units. The object editor 103B is activated from the NRCS block 20, and displays, creates, and changes objects on the database. In addition, the object editor 103B exchanges objects with the database unit 101 through the object manager 103C.

The object manager 103C manages objects edited by the object editor 103B, reads objects out of the database unit 101, and writes objects in the database unit 101. The MOS device interface 103D acquires information such as the status of the MOS device and channel assignments, and writes the information in the database unit 101.

In addition, the NRCS plug-in/playlist viewer unit 102 graphically displays a created playlist, or the state of a playlist on the air. The NRCS plug-in/playlist viewer unit 102 includes the playlist viewer 102A that displays an automation playlist and an on-air playlist (OA Playlist) 102B that displays a playlist on the air.

The playlist viewer 102A displays the detail of a playlist created and changed in the NRCS block 20. The on-air playlist 102B displays and manages the progress of a playlist going on the air. The on-air playlist 102B displays a playlist on the air, and displays the current on-air position. In addition, the on-air playlist 102B displays the standby situations of video and audio materials. Moreover, the on-air playlist 102B specifies subsequent items/formations.

The device control unit 105 controls various devices based on a playlist through consoles (CCP for MVS, and JL Cooper Modules). The device control unit 105 includes an on-air manager (OA Manager) 105A, an event controller 105B, a device controller 105C, and a manual controller (Manual Controller) 105D.

The on-air manager 105A manages on air broadcasting. In other words, the on-air manager 105A notifies activation to the device control unit 105 by manipulations of activating and finishing a playlist, and conducts standby and finishing processes of a playlist.

The event controller 105B executes a single event in a playlist. In other words, the event controller 105B instructs the device controller 105C about operations necessary at the next standby time, based on a playlist on the database unit 101.

In addition, the event controller 105B instructs a series of operations conducted when on air (TAKE). In other words, the event controller 105B sends an on-air timing (Take Trigger) to the device controller 105C. In this case, the event controller 105B sends an on-air timing to the device controller 105C by creating and sending a symbolic command/time line.

In addition, the event controller 105B stores device statuses in the database unit 101.

The manual controller 105D generates an on-air timing (Take Trigger) manually, by notification from a master (Master Switcher), or according to time. In addition, the manual controller 105D conducts assignable event/device control by a utility/shot box module. In addition, the manual controller 105D conducts control necessary for playlist execution such as TAKE manipulations and dialogues. In addition, the manual controller 105D executes temporary events by quick recall. Moreover, the manual controller 105D controls devices independently.

The device controller 105C controls devices. In other words, the device controller 105C interprets an abstracted symbolic command, and transforms it into a predetermined protocol to control devices. In addition, the device controller 105C transforms the protocol into an abstracted status, and notifies it to the event controller 105B. In addition, the device controller 105C holds the time line of the symbolic command, and controls synchronization by an on-air timing (Take Trigger).

The on-air playlist/setup unit 104 makes settings of the automation core system and configurations of control devices by a setup/configuration 104A. The log/alarm manager unit 106 collects various logs and alarms scattered to individual terminals by a log/alarm manager 106A, and when a trouble occurs, the log/alarm manager unit 106 notifies it to an SNMP manager. The database unit 101 collectively manages information such as playlists, events, settings, and statuses.

Figure 7:
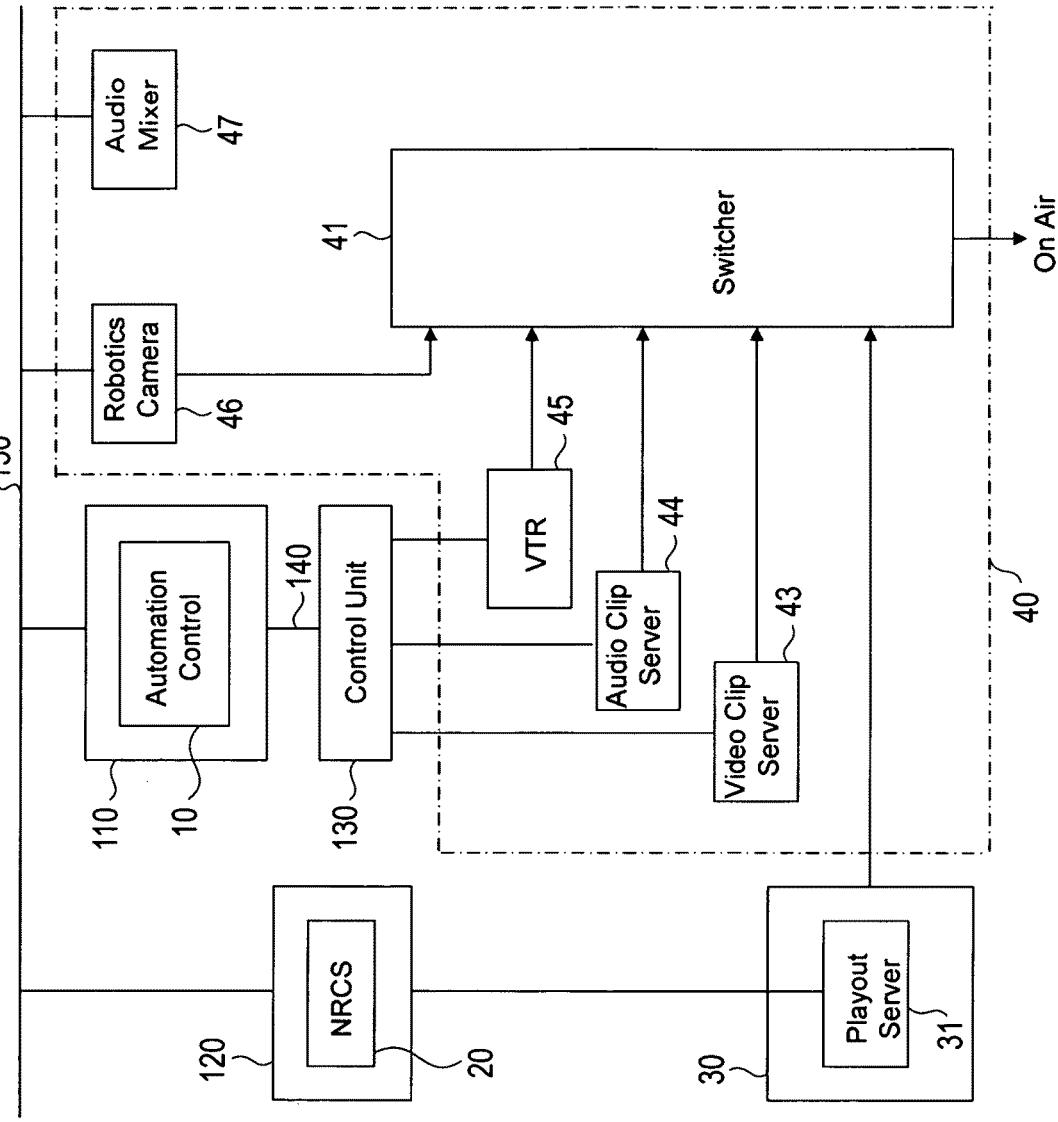
FIG. 7 is a diagram depicting an exemplary configuration of essential units of the broadcast programming delivery control system.
Figure 8:
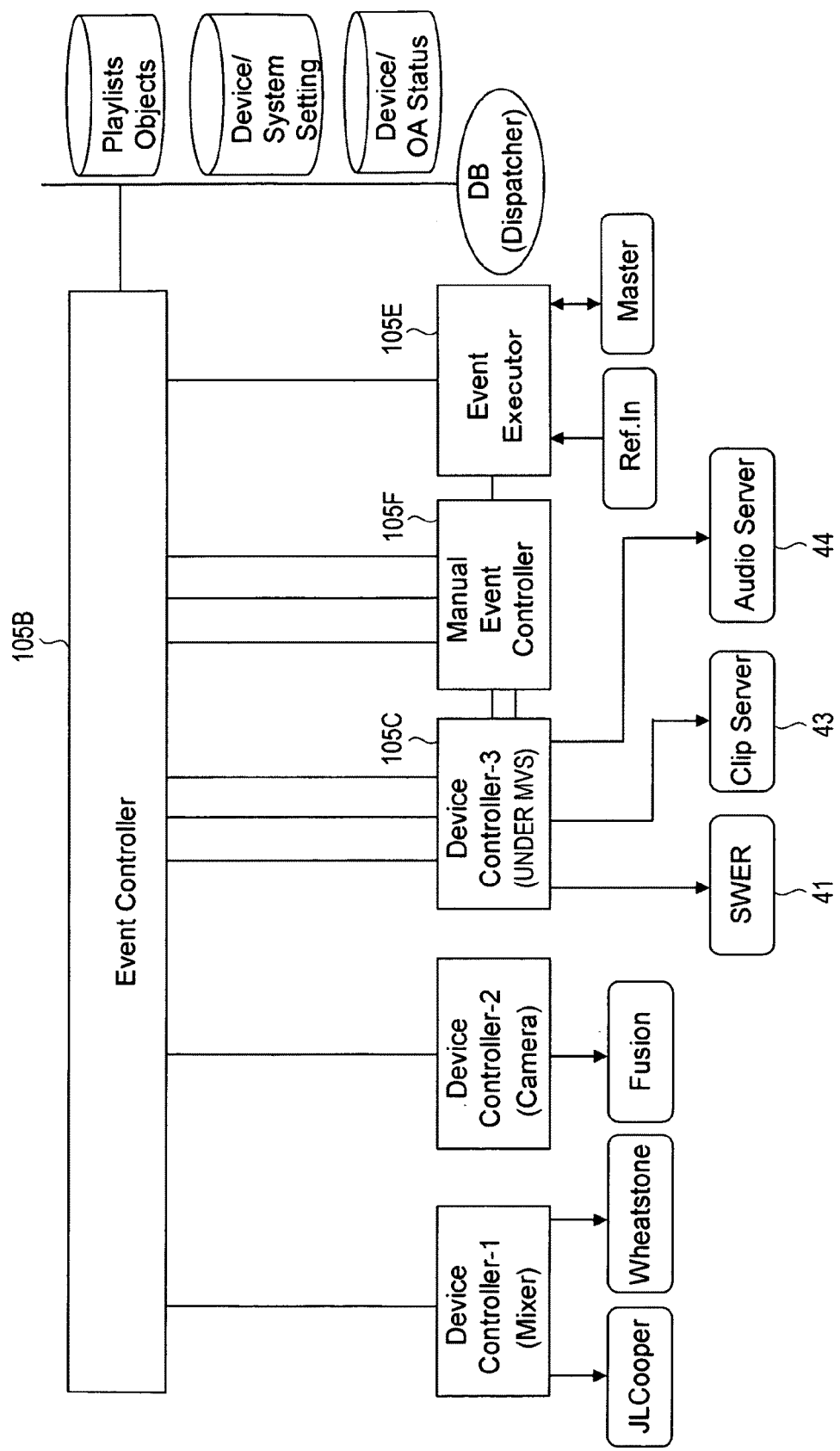
FIG. 8 is a diagram depicting an exemplary configuration of essential software modules in the broadcast programming delivery control system.

1-5. Configurations of Essential Units of the Broadcast Programming Delivery Control System 100, and Configurations of Essential Software Modules FIG. 7 shows an exemplary configuration of essential units of the broadcast programming delivery control system 100. In addition, FIG. 8 shows an exemplary configuration of essential software modules in the broadcast programming delivery control system 100.

In other words, the broadcast programming delivery control system 100 has the automation control block 10 and the NRCS block 20. The automation control block 10 controls programmed broadcast programming delivery based on the software blocks installed in the first computer unit (Automation Ctrl PC) 110. The NRCS block 20 conducts management and administration related to a news program such as arrangements for gathering information, placing orders of materials, and making formations of broadcast programming, based on the software blocks installed in the second computer unit 120.

In addition, the broadcast programming delivery control system 100 has the MOS device block 30 formed of MOS devices such as the playout server 31, and the CG/still store 32. The MOS device block 30 is networked to the second computer unit 120.

In addition, the broadcast programming delivery control system 100 has the automation control device block 40 formed of the switcher 41, the device controller (DCU) 42, the video clip server 43, the audio clip server 44, the VTR 45, the robotics camera 46, and the audio mixer 47. The automation control device block 40 is networked to the first computer unit 110.

In addition, the broadcast programming delivery control system 100 has a control unit (SCU) 130 having a video reference input. In addition, the broadcast programming delivery control system 100 has a communication channel 140 connecting between the control unit 130 and the first computer unit 110, and a network 150 networking the first computer unit 110 to the second computer unit 120.

On the control unit 130, an event executer 105E is mounted, which is an execution and management module sending a video signal reference (Ref. In) to the first computer unit 110 through the communication channel 140.

On the first computer unit 110, a software module that manages playlist information and a device driver software module in conformity to video devices to be controlled are mounted. In addition, on the first computer unit 110, an event execution module is mounted. The event execution module has a software interface capable of adding a device driver software module, and a software interface to a device control module in the control unit 130.

The event executor 105E is a software module operated by a microcomputer of the control unit 130. Ref. In is a reference input, and reference signals (for example, black burst signals) of the entire equipment are supplied to the control unit 130. The control unit 130 is configured to interrupt the built-in microcomputer by the reference signals at one-field intervals.

When this interrupt occurs, the event executor 105E notifies the other software module on the same microcomputer, for example, a manual event controller 105F about that. At the same time, the event executor 105E also notifies the first computer unit (automation Ctrl PC) 110 through the communication channel 140. More specifically, the event executor 105E is in a wait state for tasks. The event executor 105E receives a wait cancelation from an interrupt process routine by the reference signal to again start to run a task for the above-described process, and then enters the wait state again when finishing it.

The manual event controller 105F receives an interrupt notification to organize several processes at one-field intervals. For example, the control unit 130 has a push button to control the switcher. The manual event controller 105F sends the event that the push button has been pressed as a command to the switcher 41 that is the automation control device in the automation control device block 40 through the communication channel.

This transmission is conducted at one-field intervals, whereby no delay occurs in control, and degraded efficiency can be avoided because of very frequent communications. The manual event controller 105F accumulates information about the pressed button, forms information in a command format as one field of press-down information by interrupt notification, and then sends it to the switcher 41. In addition, the manual event controller 105F sends the command to the switcher 41 as well as sends information about the pressed button to the first computer unit (automation Ctrl PC) 110.

The event controller 105B that is a software module in the first computer unit (automation Ctrl PC) 110 controls execution of control events for various devices in accordance with playlist information. The progress of the playlist is conducted according to time code. The event controller 105B receives notification from the control unit 130 at one-field intervals, whereby the event controller 105B can control the progress with the use of this notification as clock information. When the system is operating according to interlacing, because two fields make one frame, receiving two notification increases time code by one.

When time code reaches a predetermined position (time position) in the playlist, the operation at this position is executed. Here, suppose that the device controller that is the software module on the first computer unit 110 is considered to be a first device controller, and the device controller that is the software module on the control unit 130 is considered to be a second device controller. The event controller 105B sends an instruction in accordance with the playlist to at least any one of the first device controller and the second device controller.

Both of the device controllers transform the instruction into a native protocol of a device to be controlled (control protocol of each device), and sends it from individual ports (RS422, and Ethernet (registered trademark)).

A device controlled by an interface that a PC does not generally has, such as RS422 or a dedicated LAN, can be connected to DCU42 for control, DCU42 covering the port unit of the control unit 130. On the other hand, a device connected to a multipurpose Ethernet can be connected to the PC for similar control.

The device controller (second device controller) on the control unit 130 synchronizes with reference signals for control, in order to control the switcher (Switcher) 41 and the video tape recorder 45 in the automation control device block 40. Consequently, in the broadcast programming delivery control system 100, a device controlled from the first computer unit (automation Ctrl PC) 110 side can be synchronized with the control unit 130 side for operation.

It is unnecessary to provide hardware to receive reference signals in the first computer unit (automation Ctrl PC) 110, and the communication channel according to Ethernet is used, whereby costs can be suppressed. In addition, flexible configurations as shown in FIGS. 3, 4, and 5 are feasible, and multipurpose products can be used in replacing the computer unit, which is economical.

The control unit 130 conducts transformation into a native protocol of the device connected to the control unit 130. On this account, loads are not concentrated on the first computer unit (automation Ctrl PC) 110 side, and loads are distributed to economically execute device control with no delay in synchronization with reference signals.

In FIG. 8, the master connected to the event executor 105E is a master switcher. The master switcher is a switching apparatus at higher level than the switcher and this system in a broadcast station, and the master switcher allocates video signals in the overall broadcast station, while this system belongs to a specific studio.

The control unit (SCU) 130 receives instructions and timings from the master (Master) through a port such as a GPI (General Purpose Interface). The GPI is the port to receive instructions and triggers in response to reception of simple ons/offs in a parallel port. The master switches outputs from the station to studio outputs or CM. In switching from a CM to a studio output, the automation receives a trigger from the GPI to start the formations after the CM. In this case, the master takes the initiative of switching. Conversely, such an operation may be possible that a frame called "CM" is provided in a formation, a trigger is given to the master from the studio by a GPI output in the reverse direction, and then the master switches to a CM.

In addition, the event executor 105E relays among the master switcher, the other software module, and the first computer unit (automation Ctrl PC) 110. It is necessary to assure that delay in relay does not exceed a defined field unit. To this end, when the operation is started at the timing according to the reference signal, a GPI input is read. When the level is changed, it is determined what instruction is made in accordance with the setting of the GPI port, and a notification is made to the other software module and/or to the first computer unit (automation Ctrl PC) 110 correspondingly.

When an output is made from the GPI, the event executor 105E processes the instruction received from the other software module and the first computer unit (automation Ctrl PC) 110 in units of fields. In other words, when the operation is started at the timing according to the reference signal, the event executor 105E organizes the received instructions to change the level of GPI output in accordance with the settings of the individual GPI ports.

The event executor 105E has a plurality of processes to conduct at the timing according to the reference signals. Executing every field is essential to reduce the delay in this execution to one field or below (two fields or below from reception to completion of transmission). The upper limit of delay can be ensured even though the order during the process is not strictly defined.

In FIG. 6, a Microsoft SQL Server can be used as a data server of the database unit 101. When a certain application rewrites the database unit 101, the data server uses an MS SQL function to notify the other application of a changed item. This is called a dispatcher. Properly speaking, the individual applications resister items desired to notify, receive change notification, and then reads the database unit 101. When alteration is made in a formation after the current point in time in a playlist, or the order of formations is changed, the first computer unit 110 uses this function to prepare change in control.

As described above, in the broadcast programming delivery control system 100, the control unit 130 having the reference input sends a timing for reference to the first computer unit 110. Then, the event executor 105E receives this timing for reference, and controls the device driver software module in the first computer unit 110 and the device control module in the control unit 130.

Thus, in the broadcast programming delivery control system 100, video devices having various control operations interfaces can be controlled in synchronization with the timing for reference in accordance with the playlist, and delivery control can be implemented at accurate timings also in conjunction with the NRCS block 20.

1-6. Configuration of the Switcher

Figure 9:
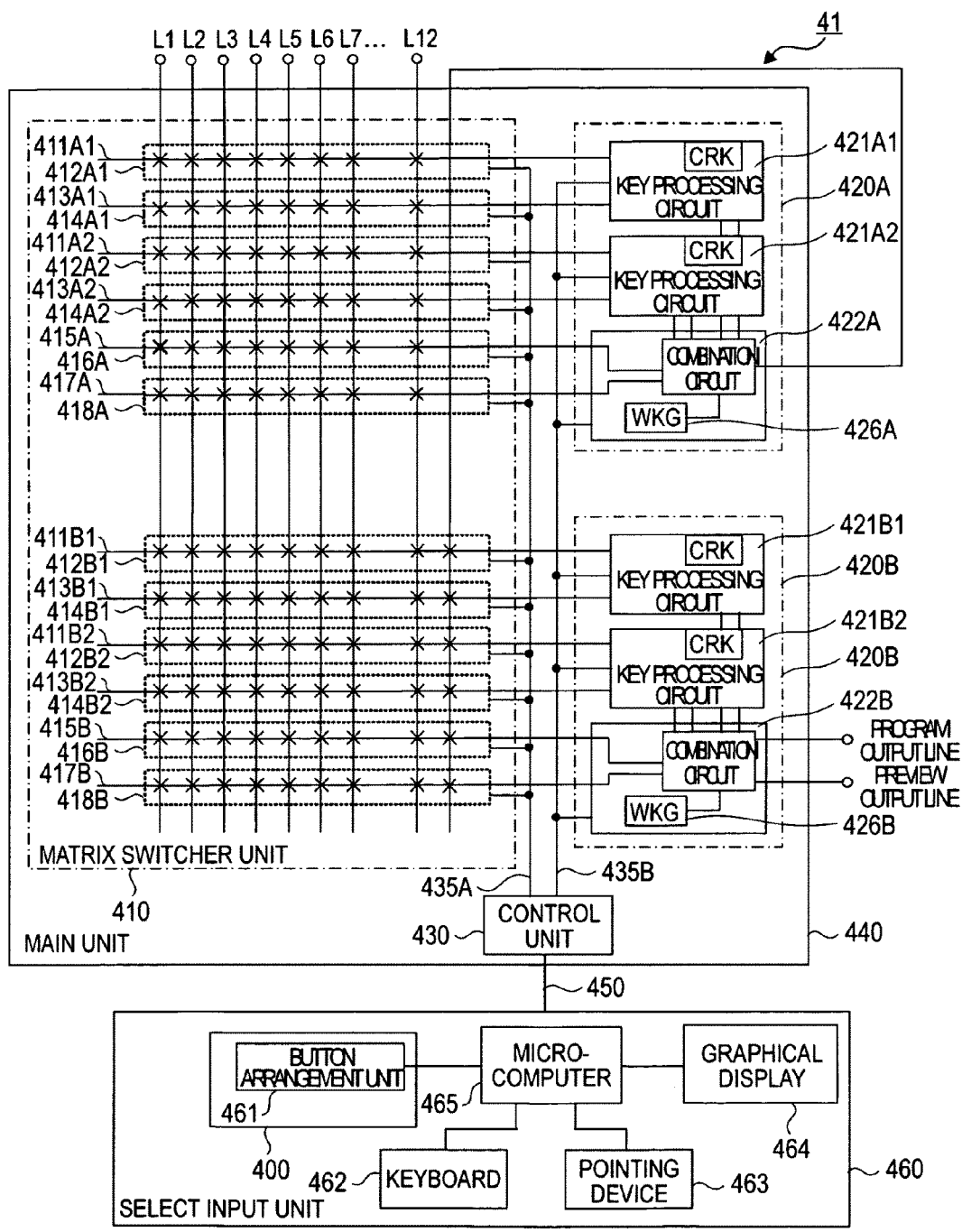
FIG. 9 is a diagram depicting an exemplary configuration of a switcher.

Next, the switcher 41 will be described. FIG. 9 shows an exemplary configuration of the switcher 41. The switcher 41 has a main unit 440, and a select input unit 460 connected to the main unit 440 through a communication channel 450. The main unit 440 has a matrix switcher unit 410, a first image processing unit 420A, a second image processing unit 420B, and a control unit 430. The first image processing unit 420A and the matrix switcher unit 410 corresponding to this configure a first ME bank. In addition, the second image processing unit 420B and the matrix switcher unit 410 corresponding to this configure a second ME bank.

The matrix switcher unit 410 selects video signals inputted to input lines L1 to L12. To the first image processing unit 420A and the second image processing unit 420B, video signals inputted to the input lines L1 to L12 are supplied through the matrix switcher unit 410. The control unit 430 controls the operations of the matrix switcher unit 410, the first image processing unit 420A, and the second image processing unit 420B.

To the input lines L1 to L12 of the switcher 41, video signals to be key source signals or key fill signals and video signals to be background video signals are inputted. The matrix switcher unit 410 has key source cross-points 412A1 and 412A2. The key source cross-points 412A1 and 412A2 are formed of switches connected to key source signal select input buses 411A1 and 411A2 that supply one of video signals inputted to the input lines L1 to L12 as a key source signal to the first image processing unit 420A.

In addition, the matrix switcher unit 410 has key fill cross-points 414A1 and 414A2. The key fill cross-points 414A1 and 414A2 are formed of switches connected to key fill signal select input buses 413A1 and 413A2 that supply one of video signals inputted to the input lines L1 to L12 as a key fill signal to the first image processing unit 420A.

In addition, the matrix switcher unit 410 has first background cross-points 416A. The first background cross-points 416A are formed of switches connected to a first background signal select input bus 415A that supplies one of video signals inputted to the input lines L1 to L12 as a first background signal to the first image processing unit 420A. In addition, the matrix switcher unit 410 has second background cross-points 418A. The second background cross-points 418A are formed of switches connected to a second background signal select input bus 417A that supplies one of video signals inputted to the input lines L1 to L12 as a second background signal to the first image processing unit 420A.

In addition, the matrix switcher unit 410 has key source cross-points 412B1 and 412B2. The key source cross-points 412B1 and 412B2 are formed of switches connected to key source signal select input buses 411B1 and 411B2 that supply one of video signals of the input lines L1 to L12 and output lines of the first ME bank as a key source signal to the second image processing unit 420B.

In addition, the matrix switcher unit 410 has key fill cross-points 414B1 and 414B2. The key fill cross-points 414B1 and 414B2 are formed of switches connected to key fill signal select input buses 413B1 and 413B2 that supply one of video signals of the input lines L1 to L12 and output lines of the first ME bank as a key fill signal to the second image processing unit 420B.

In addition, the matrix switcher unit 410 has first background cross-points 416B. The first background cross-points 416B are formed of switches connected to a first background signal select input bus 415B that supplies one of video signals inputted to the input lines L1 to L12 and output lines of the first ME bank as a first background signal to the second image processing unit 420B. In addition, the matrix switcher unit 410 has second background cross-points 418B. The second background cross-points 418B are formed of switches connected to a second background signal select input bus 417B that supplies one of video signals inputted to the input lines L1 to L12 and output lines of the first ME bank as a second background signal to the second image processing unit 420B.

The first image processing unit 420A is formed of key processing circuits 421A1 and 421A2 and a combination circuit 422A. The key processing circuits 421A1 and 421A2 are connected to the key source signal select input buses 411A1 and 411A2 and the key fill signal select input buses 413A1 and 413A2. To the key processing circuits 421A1 and 421A2, a key source signal and a key fill signal selected from video signals inputted to the input lines L1 to L12 are inputted through the key source signal select input buses 411A1 and 411A2 and the key fill signal select input buses 413A1 and 413A2. The key processing circuits 421A1 and 421A2 generate a key signal corresponding to a control signal from the control unit 430 by the inputted key source signal or by an incorporated waveform generation circuit (wipe pattern generation circuit). Then, the key processing circuits 421A1 and 421A2 supply a key signal and a key fill signal to the combination circuit 422A.

The combination circuit 422A is connected to the key processing circuits 421A1 and 421A2 as well as connected to the first background signal select input bus 415A and the second background signal select input bus 417A. To the combination circuit 422A, the key signal and the key fill signal are inputted from the key processing circuits 421A1 and 421A2. In addition, to the combination circuit 422A, a first background signal and a second background signal selected from the video signals inputted to the input lines L1 to L12 are inputted through the first background signal select input bus 415A and the second background signal select input bus 417A. The combination circuit 422A selectively uses the key signal and the key fill signal supplied from the key processing circuit 421A1 or the key processing circuit 421A1 under control conducted by the control unit 430. Then, the combination circuit 422A conducts a keying process in which the area indicated by the key signal is replaced by the first background signal or the second background signal to combine a key fill signal under control conducted by the control unit 430.

The second image processing unit 420B is formed of key processing circuits 421B1 and 421B2 and a combination circuit 422B. The key processing circuits 421B1 and 421B2 are connected to the key source signal select input buses 411B1 and 411B2, and the key fill signal select input buses 413B1 and 413B2. To the key processing circuits 421B1 and 421B2, a key source signal and a key fill signal selected from video signals of the input lines L1 to L12 and output lines of the first ME bank are inputted through the buses 411B1 and 411B2 and the key fill signal select input buses 413B1 and 413B2. The key processing circuits 421B1 and 421B2 generate a key signal corresponding to a control signal from the control unit 430 by the inputted key source signal or by an incorporated waveform generation circuit (wipe pattern generation circuit). Then, the key processing circuits 421B1 and 421B2 supply a key signal and a key fill signal to the combination circuit 422B.

The combination circuit 422B is connected to the key processing circuits 421B1 and 421B2 as well as connected to the first background signal select input bus 415B and the second background signal select input bus 417B. To the combination circuit 422B, a key signal and a key fill signal are inputted from the key processing circuits 421B1 and 421B2. To the combination circuit 422B, a first background signal and a second background signal selected from video signals of the input lines L1 to L12 and output lines of the first ME bank are inputted through the first background signal select input bus 415B and the second background signal select input bus 417B. The combination circuit 422B selectively uses a key signal and a key fill signal supplied from the key processing circuit 421B1 or the key processing circuit 421B1 under control conducted by the control unit 430. Then, the combination circuit 422B conducts a keying process in which the area indicated by the key signal is replaced by the first background signal or the second background signal to combine a key fill signal under control conducted by the control unit 430.

In the descriptions above, the description is made in which the key signal is binary signals and the background signal or the key fill signal is specified. However, actually, the key signal is not binary signals, and the concentration of laying the key fill signal on the background signal is shown by multiple values. Therefore, such image processing can be also conducted in which a portion having the key fill signal semi-transparently seen is provided while the background is viewed.

The control unit 430 is configured of a microcomputer, for example. The control unit 430 generates a control signal corresponding to a select input signal given from the select input unit 460 thorough the communication channel 450, and controls the individual operations of the matrix switcher unit 410, the first image processing unit 420A, and the second image processing unit 420B through control lines 435A and 435B.

The select input unit 460 is formed of a microcomputer 465 to which a button arrangement unit 461, a keyboard 462, a pointing device 463 such as a mouse, and a graphical display 464 are connected. When the buttons of the button arrangement unit 461 are manipulated to select input, in the matrix switcher unit 410 of the main unit 440, the cross-points connected to the corresponding input bus are controlled to select input, and a video signal is supplied to the corresponding image processing unit. Then, video signals are processed such as image synthesis specified in the image processing unit, and video signals to form a picture area including the video signal of the selected input are outputted.

In addition, in the case of dual link mode in which video signals of progressive mode are processed in pairs, image paths are provided in pairs to be doubled on A side and B side and operations are made such that paired inputs are selected on each of A side and B side.

In the switcher 41 shown in FIG. 9, the select input unit 460 communicates with the control unit 430 of the main unit 440 through the communication channel 450 to instruct execution of various processes. The combination circuit 422A receives inputs of the background signals from the first background signal select input bus 415A and the second background signal select input bus 417A, and uses any one of the background signals for the keying process to form a background signal in accordance with the instruction from the select input unit 460. Alternatively, the combination circuit 422A combines two background signals at the instructed ratio to form a background signal used for the keying process in accordance with the instruction from the select input unit 460.

The ratio is manually instructed by a fader lever of the select input unit, or in the case of operations of automatic transition (automatic progress), the ratio is changed over time, and controlled such that one of the background signals is switched to the other background signal. As one example of the combination method, for example, there is a method in which two background signals are weighted and added for each pixel at the above-described ratio. For instance, suppose that the ratio is 30%, the value that the value of the first background signal is multiplied by 0.3 is added to the value that the value of the second background signal is multiplied by 0.7.

In addition, as another example of the combination method, there is a method in which a second background signal is superimposed on a first background signal with a wipe key signal supplied from a wipe key generator (WKG) by keying. The key signal generated in the wipe key generator is changed with the above-described ratio, and the key signal is generated such that the time of day of the progress is used as an input parameter to determine the boundary line of wipe in the case of automatic transition. In the case in which it is not automatic transition, the instructed ratio is used to generate the key signal instead of time of day. The descriptions above are the same in the case of the combination circuit 422B.

Figure 10:
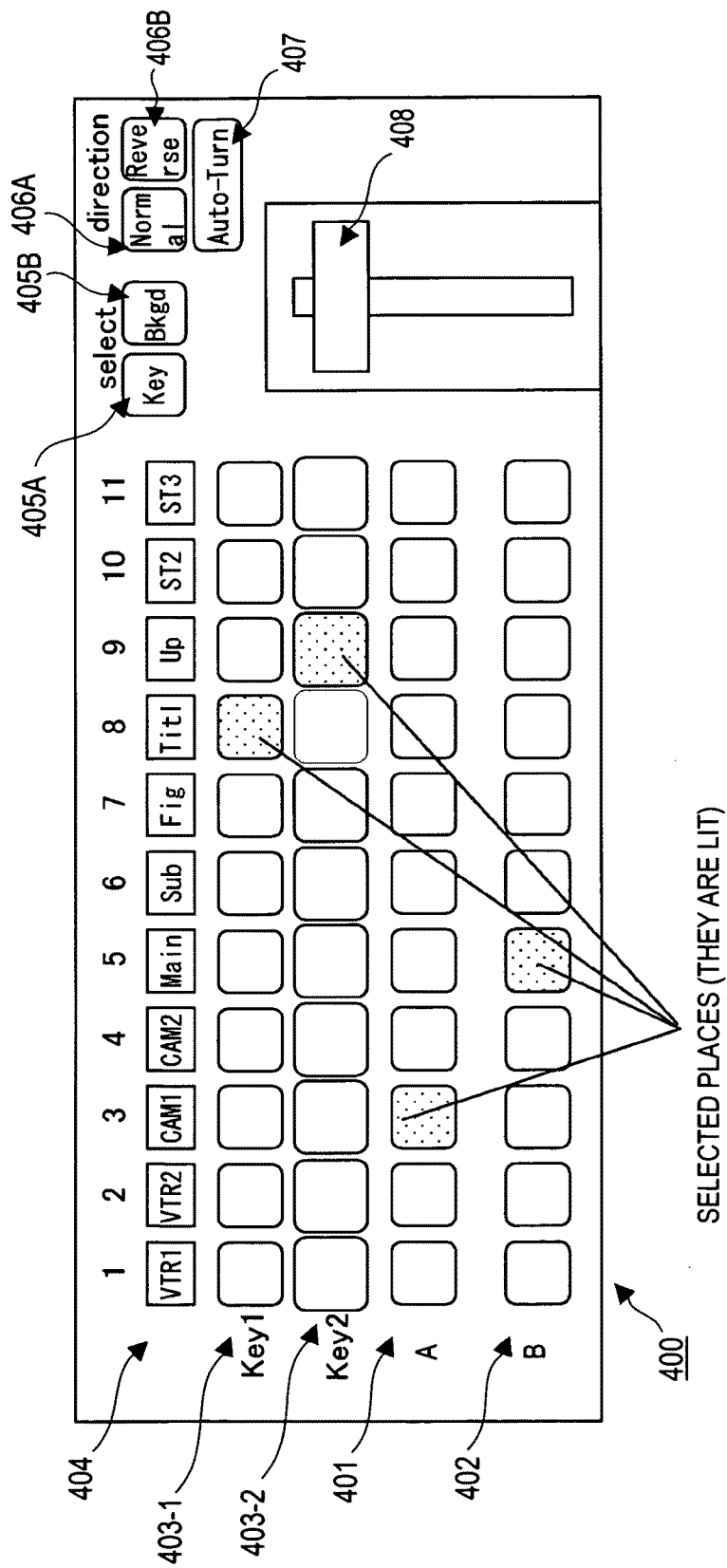
FIG. 10 is a diagram depicting the appearance of a console of the switcher.

FIG. 10 shows a diagram depicting the appearance of the console 400 of the switcher 41. The console 400 is a manipulating unit corresponding to one of the image processing units of the main unit 440 when the mode is not dual link mode. When the mode is dual link mode, the console 400 is a manipulating unit corresponding to the paired image processing units.

As shown in FIG. 10, the console 400 is provided with first background buttons 401, second background buttons 402, and key buttons 403-1 and 403-2. In addition, the console 400 is provided with source name indicators 404, transition target buttons 405A and 405B, direction specifying buttons 406A and 406B, a round-trip mode specifying button 407, and a fader lever 408.

The first background buttons 401 are manipulated when the first background signal select input bus 415A selects the input line through which the video signals to be background video signals are supplied to the combination circuit 422A. The second background buttons 402 are manipulated when the second background signal select input bus 417A selects the input line through which the video signals to be background video signals are supplied to the combination circuit 422A.

The key buttons 403-1 and 403-2 are manipulated when they select the combination of the first input line and the second line through which the video signals to be key source signals and key fill signals are supplied to the key processing circuits 421A1 and 421A2. In this case, the key source signal select input buses 411A1 and 411A2 supply the video signals to be key source signals to the key processing circuits 421A1 and 421A2 through the first input line. In addition, the key fill signal select input buses 413A1 and 413A2 supply the video signals to be key fill signals to the key processing circuits 421A1 and 421A2 through the second input line.

In FIG. 10, the source name indicators 404 displays text information associated with the index number corresponding to the button number of the button arranged below. Text information is stored in the control unit 430, and a user can set text information. In addition, text information may be stored as associated with the input line number. In this case, any one item of text information associated with the first input line number corresponding to the index number corresponding to the button number of the button and text information associated with the second input line number corresponding to the index number is displayed.

The first input line number is a number to select the video signal to be the key fill signal, and the second input line number is a number to select the video signal to be the key source signal. Thus, a pair of the first input line number and the second input line number is associated with the index number corresponding to the button number. Therefore, the key buttons can select the combination of the first and second input lines through which the video signals to be the key source signal and the key fill signal are supplied to the key processing circuit.

When the background buttons are manipulated, the background video signal is selected by the first input line number. Such a scheme may be possible that the source name indicator 404 generally displays text information associated with the first input line number, and displays text information associated with the second input line number only while a separately provided button, not shown, is pressed down. Thus, the operator can confirm text information of the first and second line numbers. In addition, associations of the index number corresponding to the button number and the input line number corresponding to the index number are called cross-points button assignments. On the console 400, the selected button (switch) is lit.

In the broadcast programming delivery control system 100, the NRCS block 20 obtains channel assignment information acquired from the playout server 31, and automatically selects the cross-points (XPT) of the switcher 41 set in the playlist in the automation control block 10. In other words, according to the MOS protocol, channel assignment information in the playout server 31 is passed to the NRCS block 20.

The automation control block 10 obtains channel assignment information in the playout server 31 by means of roStorySend according to the MOS protocol or FTP. Then, the automation control block 10 sets and changes the cross-points of the switcher 41 based on channel assignment information.

Figure 11:
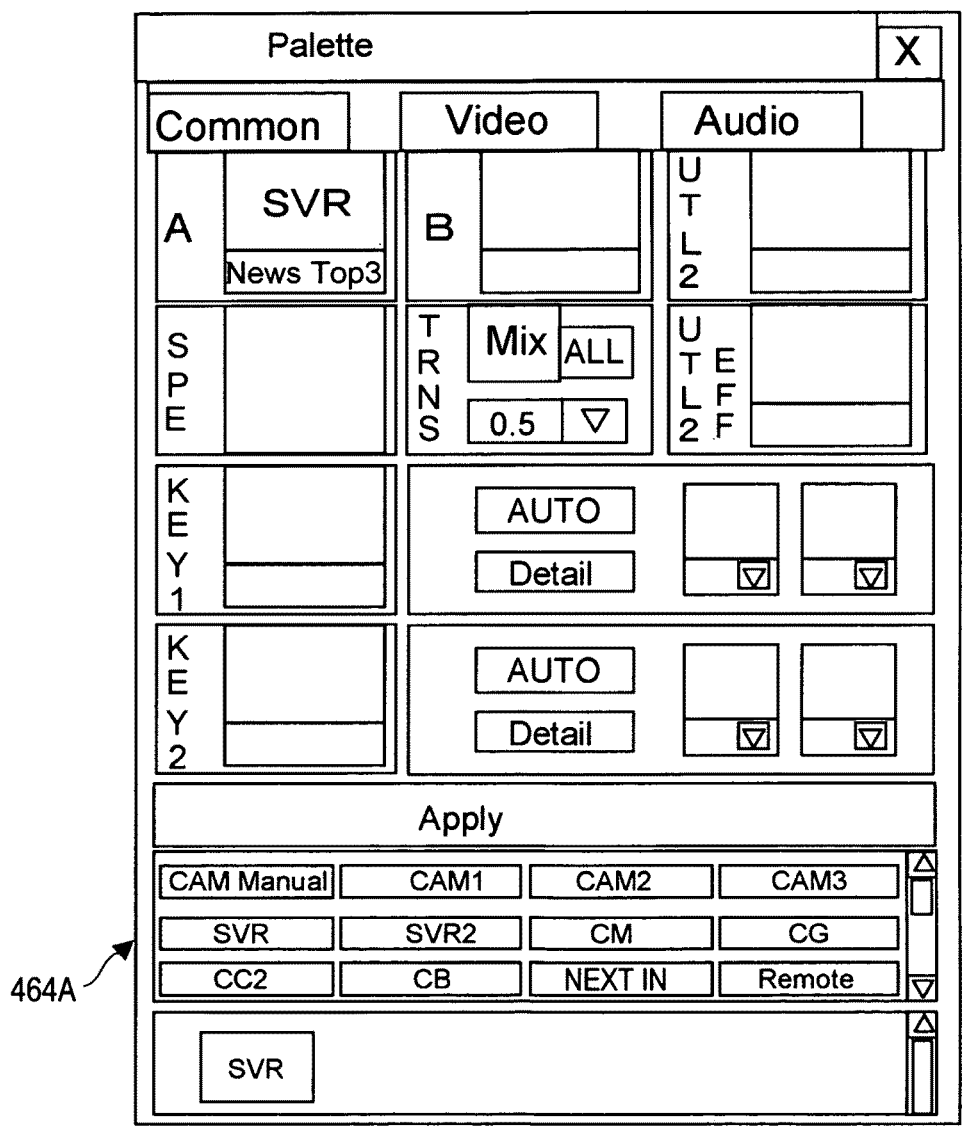
FIG. 11 is a diagram depicting a palette selected by SVR through the console.

In creating a playlist, when video sources are selected, the setting is made as only the playout server 31, and no channel is set. In other words, on the display screen of the graphical display 464, when SVR is selected on a palette 464A shown in FIG. 11, SVR is set on a playlist 464B shown in FIG. 12. However, no channel is set. When the automation control block 10 obtains channel information from the NRCS block 20, the automation control block 10 displays channel information in the playout server 31 on the playlist to set the cross-points of the switcher 41.

In other words, in the broadcast programming delivery control system 100, the automation control block 10 installed in the first computer unit 110 executes the playlist. In this case, the automation control block 10 references to information about the material passed from the NRCS block 20, channel assignment information and the playlist, when the playout server 31 enters the state of outputting a certain material from the output channel.

Then, the automation control block 10 conducts a process of instructing a proper bus of the switcher 41 to select an input connected to the output channel of the playout server 31 in accordance with the material select schedule in the playlist and the process schedule of the switcher 41. For example, when a certain material is used as background video in the playlist, for the proper bus, any one of the background signal select input buses is fit, and then an instruction is made to select the corresponding input in the cross-points.

Alternatively, when a material for subtitles is keyed, the corresponding input is selected at the cross-points of the key source signal select input bus and the key fill signal select input bus, and then the material is used. Alternatively, when a sub-picture area is provided according to picture in picture, the corresponding input is selected by the key fill signal select input bus to obtain video signals of a material. Then, the video signals are subjected to compression, key signals only for the sub-picture area generated inside the key processing circuit, and the sub-picture area is formed for keying without using video signals from an external unit through the key source signal select input bus.

Then, on the display part of the source name indicators 404 on the console 400 of the switcher 41 at the position corresponding to an operator to select an input connected to the output channel of the playout server 31, information about the material obtained from the first computer unit 110 is displayed. Here, the operator to select the input connected to the output channel of the playout server 31 is the first background buttons 401, the second background buttons 402, and the key buttons 403-1 and 403-2.

In the control unit 430, the switcher 41 has a correspondence storage unit capable of setting correspondences between the operators of the console 400 and the corresponding inputs of the switcher 41. The first computer unit 110 sends an instruction about the above-described correspondence for the input of the switcher 41 scheduled for use in the program through the output channel of the playout server 31, and assigns the correspondence to the operator of the console 400. In addition, the instruction about the correspondence includes material information, and this material information is displayed on the source name indicator 404 as corresponding to the operator of the console 400 in this example.

In addition, other than the relation to the playout server 31, material servers such as the video clip server 43 and the audio clip server 44 may similarly change the correspondence also in changing a material outputted from a certain output channel.

1-7. Specific Example of Broadcast Programming Delivery

Next, a specific example of broadcast programming delivery in the broadcast programming delivery control system 100 will be described. Here, suppose that the output channels of the material server are CH1 and CH2. Then, materials outputted from the output channels CH1 and CH2 are supposed to be clip A, clip B, and clip C. The output channels CH1 and CH2 of the material server are supposed to be connected to the inputs 1 and 2 of the switcher 41. In addition, in the playlist (cue sheet), materials are used in the order shown in Table 1 in image processing conducted by the switcher 41. In this case, an example is shown that the progress of the playlist follows time of day.

TABLE 1

|  | Time | | | | |
| --- | --- | --- | --- | --- | --- |
|  | t1 | t2 | t3 | t4 | t5 |
| Background | A | B | A | B | A |
| P in P | — | — | — | — | B |
| Subtitle | — | — | C | C | — |

In other words, although the number of channels for use at the same time is two channels, three types of materials are used. Although the delivery control computer executes the above-described playlist, materials are outputted in the order shown in Table 2 because the number of the output channels of the material server is two. This detail is output channel information for the entire time of day.

TABLE 2

|  | Time | | | | |
| --- | --- | --- | --- | --- | --- |
|  | t1 | t2 | t3 | t4 | t5 |
| Ch1 | A | B | C | C | A |
| Ch2 | — | — | A | B | B |

Because the control of the switcher 41 is instructed as input 1 and input 2, the order is shown in Table 3.

TABLE 3

|  | Time | | | | |
| --- | --- | --- | --- | --- | --- |
|  | t1 | t2 | t3 | t4 | t5 |
| Input 1 | A | B | C | C | A |
| Input 2 | — | — | A | B | B |

Consequently, to the switcher 41, instructions are made in the order shown in Table 4. In addition, in Table 4, the numbers indicate the input numbers.

TABLE 4

|  | Time | | | | |
| --- | --- | --- | --- | --- | --- |
|  | t1 | t2 | t3 | t4 | t5 |
| Background | 1 | 1 | 2 | 2 | 1 |
| P in P | — | — | — | — | 2 |
| Subtitle | — | — | 1 | 1 | — |

For automatic control, when cross-points control (control of the matrix switcher unit) is executed as discussed above, scheduled pictures can be outputted. Suppose that the possibility that operations are switched to manual operations is taken into account, preferably, material titles (A, B, C) are displayed on source name displays corresponding to the cross-points buttons of the console 400 of the switcher 41. In order to implement this, source name information is supplied to the switcher (the system including the console), the associations with material titles are executed. The source name information gives the switcher 41 a title (character string) corresponding to each input.

Table 5 shows inputs of the switcher 41 and exemplary sources (signal sources).

TABLE 5

| Switcher input number | Source |
| --- | --- |
| 1: | Ch1 of material server 1 |
| 2: | Ch2 of material server 1 |
| 3: | Ch1 of material server 2 |
| 4: | Ch2 of material server 2 |
| 5: | Ch3 of material server 2 |
| 6: | VTR 1 |
| 7: | VTR 2 |
| 8: | Studio camera 1 |
| 9: | Studio camera 2 |
| 10: | Outside broadcast van 1 |
| 11: | Outside broadcast van 2 |
| 12: | Outside broadcast van 3 |

In addition, Tables 6 and 7 show exemplary settings of cross-points button assignments. Here, a single input line number is simply assigned to a button number.

TABLE 6

Exemplary assignments (no VTR)

|  | Button number | | | | | | |
| --- | --- | --- | --- | --- | --- | --- | --- |
|  | 1 | 2 | 3 | 4 | 5 | 6 | 7 |
| Input number | 1 | 2 | 8 | 9 | 10 | 11 | 12 |

TABLE 7

Exemplary assignments (no outside broadcast van)

|  | Button number | | | | | | |
| --- | --- | --- | --- | --- | --- | --- | --- |
|  | 1 | 2 | 3 | 4 | 5 | 6 | 7 |
| Input number | 1 | 2 | 8 | 9 | 6 | 7 | 3 |

For example, in assignments in Table 6, because input line number 1 is assigned to button number 1, for instance, "CH1 of the material server 1" is displayed on the indicator corresponding to button number 1 in accordance with Table 5. In addition, for example, "outside broadcast van 1" is displayed on the indicator corresponding to button number 5.

As described above, instructions are made from the automation control block 10 installed in the first computer unit 110 such that only signal sources for use in a broadcast programming are assigned to buttons. Depending on types of the playout server 31, it is difficult to continuously use the same channel for outputting different materials. Thus, channel assignment control in consideration of this point is necessary.

In this case, for example, even though a program (broadcast programming) uses a single material all the time, two channels (CH1, CH2) are used for operations. For example, in the playout server 31, control is conducted in such a way that material A is outputted from CH1, material B is then outputted from CH2, material C is outputted from CH1, and material A is outputted from CH2.

To the cross-points of the switcher 41, inputs connected to CH1 and CH2 are assigned. Then, in using materials in the progress of the broadcast programming, cross-points are controlled so as to select the corresponding input. Thus, in the broadcast programming, a material used at each point in time is specified, it is unnecessary for operator to be aware from which channel that material is outputted, and the material is correctly selected.

As described above, it is sufficient that the first computer unit 110 acquires from the playout server 31 which material is outputted from which channel with enough lead time to prepare control before the timing of each switching. This acquisition may be made before broadcast programming is started, and it is sufficient that the above-described lead time is kept even though the broadcast programming is ongoing.

Because the automation control block 10 knows materials used in the playlist, the automation control block can identify materials for use from the playlist. In addition, because materials for use are assigned to buttons, even though operations are suddenly moved to manual operations, necessary materials can be selected.

In addition, on the console 400 of the switcher 41, cross-points buttons are generally capable of selecting doubled inputs with the use of a "shift" button. However, because manipulations with pressing the shift button cause time and effort, it is convenient that materials for frequent use are allocated to buttons of smaller numbers, not with the shift button. Even though buttons are provided enough, when inputs for use in the broadcast programming are assigned to buttons of smaller numbers, the ease of manipulation is improved in manual operations.

In addition, even though the automation control block 10 makes cross-points button assignments, because the material title is displayed on the source name indicators 404 on the console 400 of the switcher 41, manual manipulations including VTR1 and VTR2 have no troubles.

1-8. Superimposition on an Image Taken by a Camera

Figure 13:
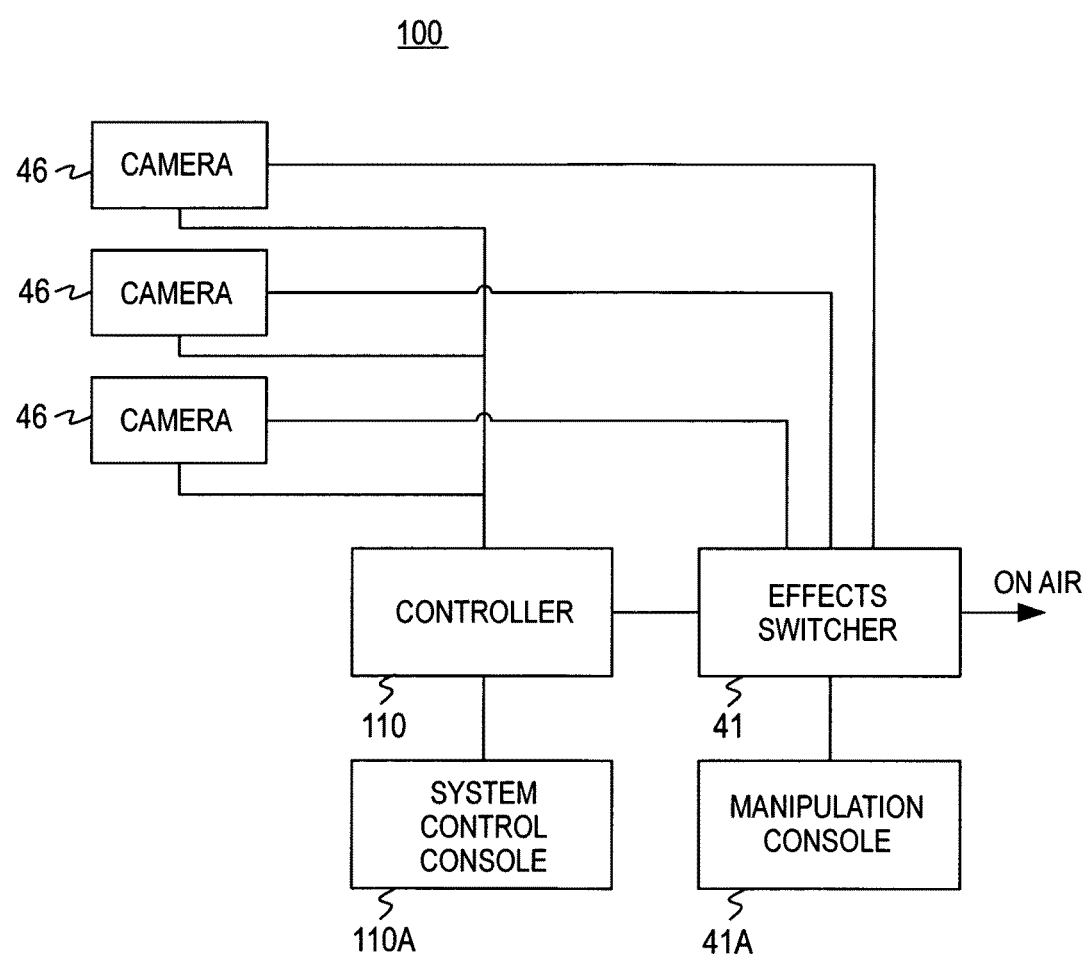
FIG. 13 is a block diagram schematically depicting components related to superimposition on an image taken by a camera in the broadcast programming delivery control system.

Next, superimposition on an image taken by a camera will be described. FIG. 13 schematically shows components related to superimposition on an image taken by the camera 46 in the broadcast programming delivery control system 100 shown in FIG. 1 described above. In FIG. 13, components corresponding to those in FIGS. 1 and 7 are designated the same numerals and signs for properly omitting the detailed descriptions.

The controller 110 controls multiple cameras, three cameras 46 and a single effects switcher 41 in the example shown. The controller 110 stores a playlist (cue sheet) therein, and conducts broadcast programming delivery control according to the playlist, that is, the controller 110 controls the operations of the camera 46, the effects switcher 41, and other devices. The shooting state of the camera 46 is remotely controlled by the controller 110, or manually operated by an operator operating the camera 46. Here, the shooting state includes the position of the camera 46, and the angle (directions of pan and tilt) and zoom value of the camera 46.

The video signals acquired by taking images by a plurality of the cameras 46 are connected to the inputs of the effects switcher 41. The effects switcher 41 also receives other video signals to its inputs, selects an image, and applies a special effect to that image to create an output image (On Air). A manipulation console 41A controls the effects switcher 41 by manual operations. A system control console 111 is used to manipulate the controller 110. An operator uses the system control console 111 to create a playlist, to make instructions, and to conduct manual operations for other devices to be controlled.

In the embodiment, the controller 110 (first computer unit (Automation Ctrl)) determines whether a superimposition image is superimposed on an image taken by the camera when the effects switcher 41 selects the image taken by the camera (remote controlled camera) 46 as a background image. Then, the controller 110 instructs the effects switcher 41 to superimpose the superimposition image based on the determined result.

When a target (target subject) such as a person is included in an image taken by the camera 46, for example, the controller 110 determines that a superimposition image is to be superimposed. Here, the superimposition image is subtitles to explain a target. For example, when a target is a person, the superimposition image is the target person's name. The controller 110 calculates the shooting area of the camera 46 based on angle information and zoom information about the camera 46, and considers that the target is included in the image taken by the camera 46 when the position at which the target exists is included in the shooting area.

In addition, when the effects switcher 41 selects an image taken by the camera (remote controlled camera) 46 as a background image, the controller 110 calculates the position at which a superimposition image is to be superimposed based on angle information and zoom value information about the selected camera 46. Then, the controller 110 instructs the effects switcher 41 of the position at which the superimposition image is to be superimposed based on the calculated result. The details of the calculating methods of the superimposed position and the shooting area described above will be described later.

FIGS. 14A to 14C are diagrams illustrative of superimposition. For the purpose of generating an image, an intention is to desire that a person name be displayed for a person at a specific position in the area of a taken image and the name be positioned below that person. FIG. 14C shows an exemplary superimposition image. The video signals of the superimposition image are externally supplied to the input of the effects switcher 41 (from the CG/still store 32, the playout server (Playout Server) 31, and others), or read out of a memory incorporated in the effects switcher 41.

For example, when the video signals of the superimposition image are acquired from the material server, superimposition images are stored according to identifiers of material clips, not according to input numbers. In operations, which input the effects switcher 41 selects for a predetermined keyer is determined based on the correspondence between the material clip (identifier) sent from the material server and the output channel of the material server.

FIG. 14A shows an exemplary image that a first camera (camera 1) takes a person and a superimposition image is positioned below the person for superimposition. FIG. 14B shows an exemplary image that a second camera (camera 2) takes a person and a superimposition image is positioned below the person in the picture area for superimposition. In the embodiment, when the effects switcher 41 selects an image taken by the camera 46 as a background image, the image shown in FIG. 14A or FIG. 14B is automatically created as an output image.

Figure 15:
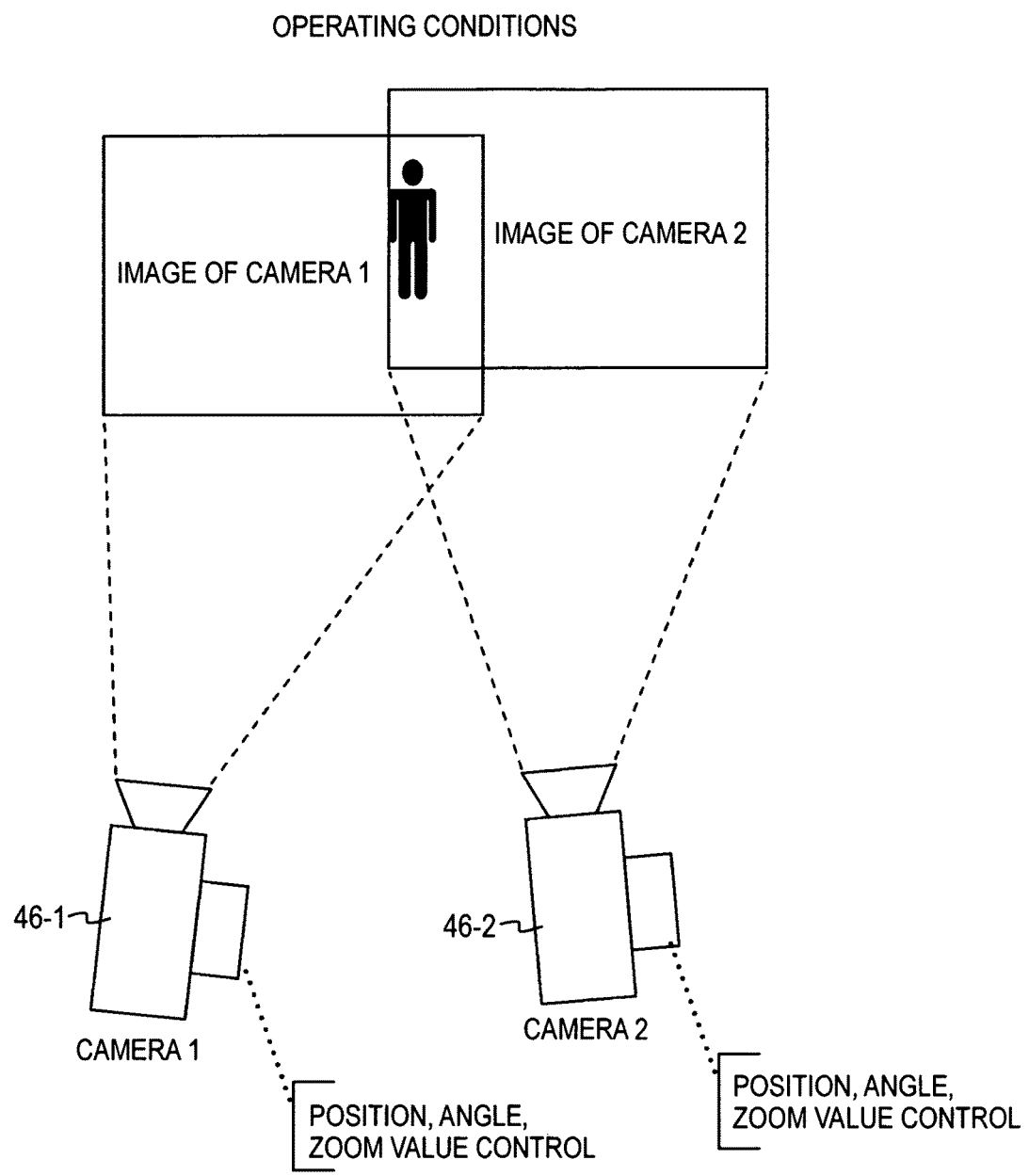
FIG. 15 is a diagram illustrative of operating conditions for a plurality of cameras.

FIG. 15 is a diagram illustrative of operating conditions of a plurality of the cameras 46. A camera 46-1 as the camera 1 and a camera 46-2 as the camera 2 shoot from different positions. In each of the cameras, control of the shooting state, that is, control of the position, the angle (directions of pan and tilt), and the zoom value is independently conducted. In this case, depending on shooting states, a target is sometimes included in the images taken by the individual cameras, or not. In the example shown, a target (target person) is included both in the images taken by the camera 46-1 and the camera 46-2.

1-9. Calculating Method of the Shooting Area

Figure 16:
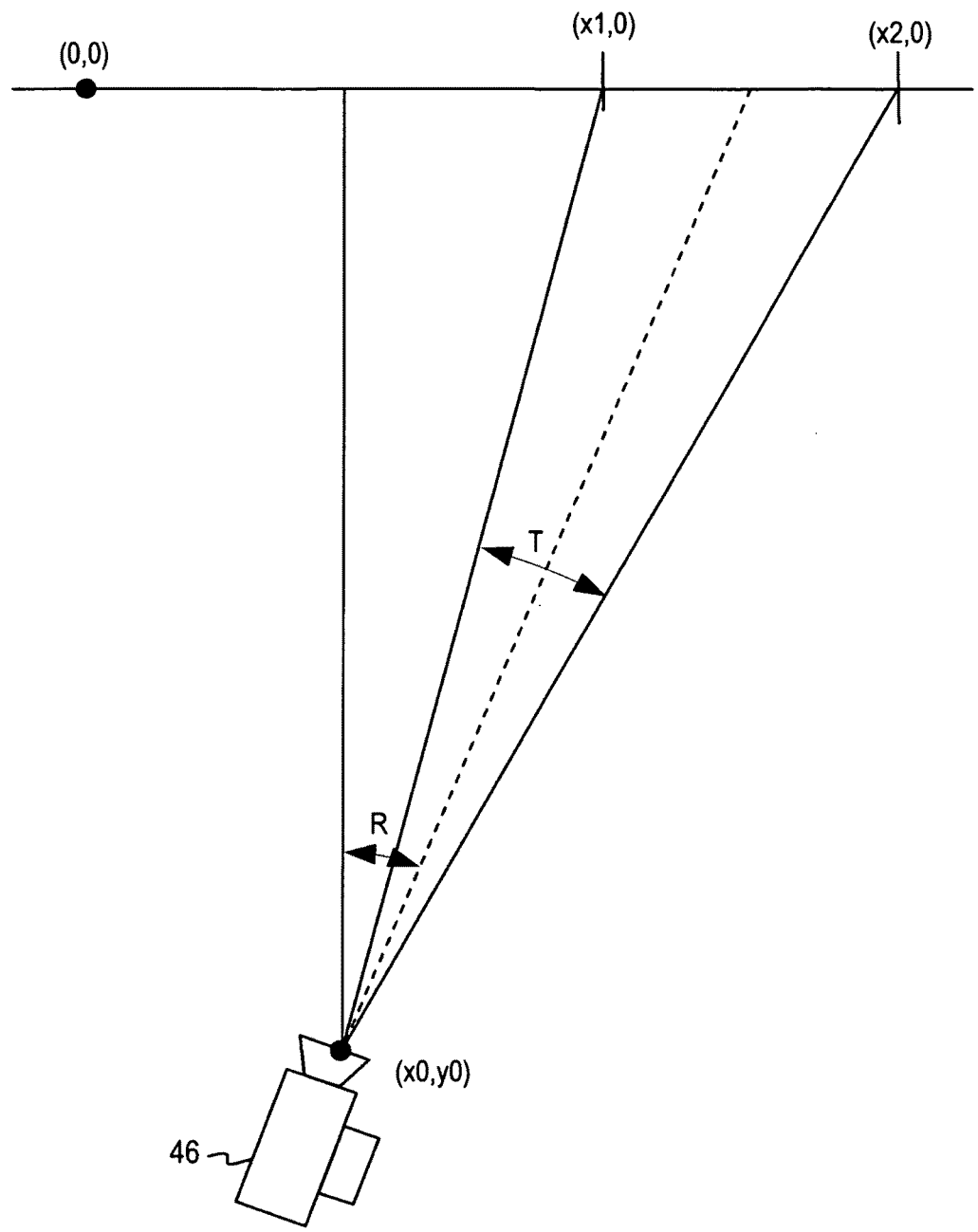
FIG. 16 is a diagram illustrative of a calculating method of a shooting area (image frame)

FIG. 16 is a diagram depicting an exemplary calculating method of the shooting area. Suppose that the position coordinates of the camera 46 are (x0,y0), and the subject is positioned on the line y=0. In addition, when the camera 46 is a fixed camera, the coordinates (x0,y0) are the fixed values. On the other hand, when the camera 46 is a movable camera, the coordinates (x0,y0) express the moved position of the camera 46. The controller 110 calculates the values of x1 and x2 indicating the shooting area on the line y☐0 from Equation (1) and Equation (2) below.

$$x1=(y0\times\tan(R-T/2))+x0 \tag{1}$$

$$x2=(y0\times\tan(R+T/2))+x0 \tag{2}$$

where the angle of the camera 46 is R as shown in the drawing and the angle of the shooting area determined by the zoom value is T.

The values x1 and x2 indicate the shooting area in the horizontal direction. Although the detailed descriptions are omitted, the shooting area in the vertical direction is similarly calculated.

When the position of a target, the position of a target person, for example, is included in the calculated shooting areas both in the horizontal direction and the vertical direction as described above, the controller 110 determines that the target is included in the taken image. In addition, in this case, the target may be treated as a point. However, it may be determined whether the target is included in the shooting area in consideration of the size of the target (width in the horizontal direction and width in the vertical direction) as necessary.

Figure 17:
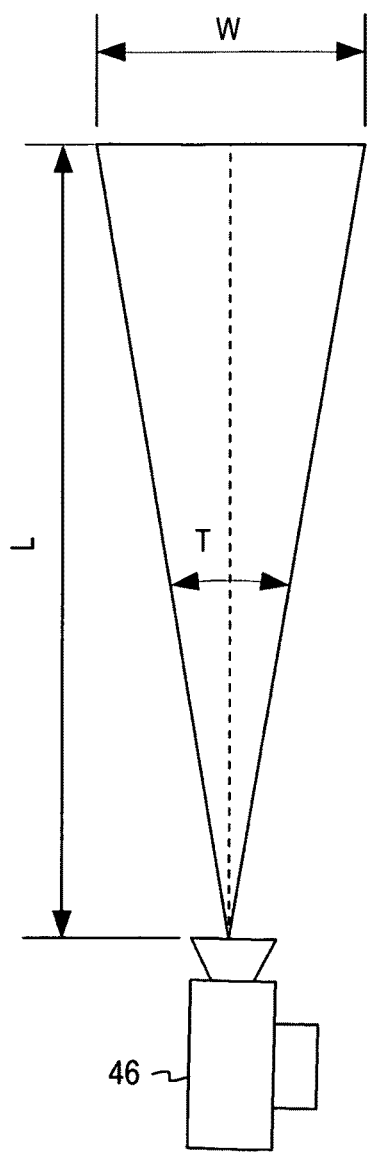
FIG. 17 is a diagram illustrative of a zoom value.

FIG. 17 is a diagram illustrative of a zoom value. Suppose that the shooting area of the angle of the camera 46 is T. The shooting area W of the subject at the distance L is expressed by Equation (3).

$$W\square 2\times L\times\tan(T/2) \tag{3}$$

When the zoom is expressed by the value, because it is easier to tell the zoom by the expression of the apparent magnification, the zoom is sometimes expressed by W, that is, the ratio of tan(T/2). However, the transformation into the angle T can be easily performed by Equation (3) described above.

1-10. Calculating Method of the Superimposed Position

In order to find the position at which the superimposition image is to be superimposed, the controller 110 first calculates the target position (target subject) in the picture area. The calculating method of the position in the picture area will be described with reference to FIG. 18. In addition, in FIG. 18, the portions corresponding to those in FIG. 16 are designated the same numerals and signs.

When the target position is at the position (xt,0), the relation of Equation (4) is held, where the angle of the incident light between the center of the taken image ((x1+x2)/2,0) and the target is V (clockwise).

$$xt=(y0\times\tan(R+V))+x0 \tag{4}$$

Figure 18:
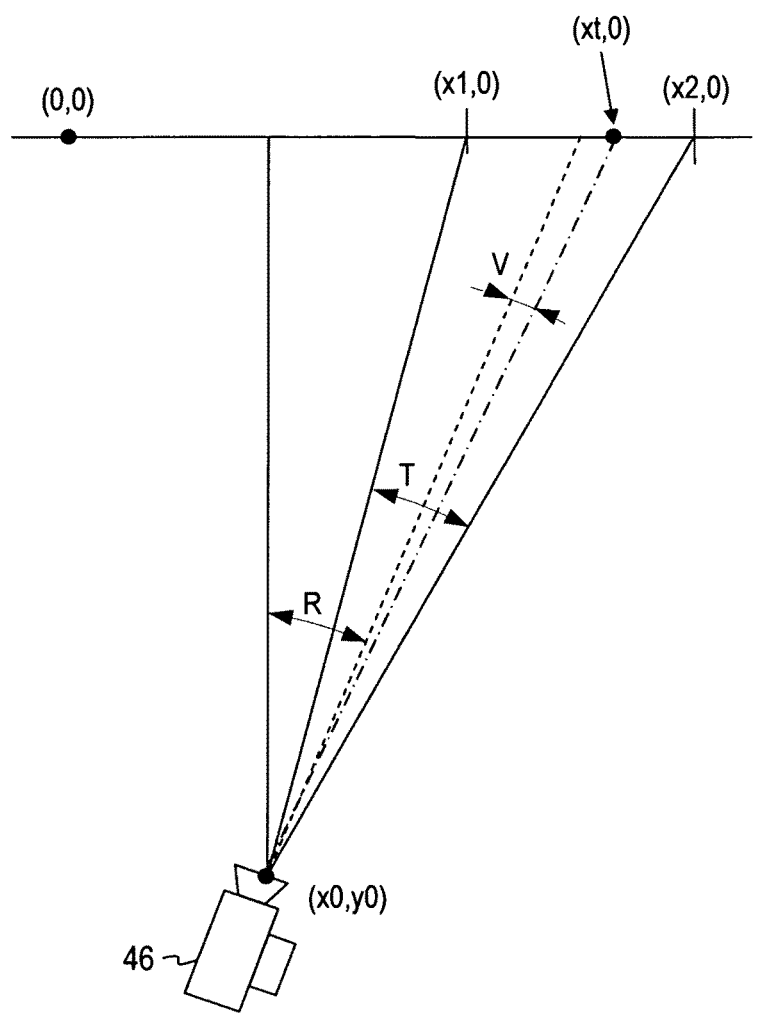
FIG. 18 is a diagram illustrative of a calculating method of target positions in a picture area.

This relation is used to obtain the angle V for the target at the position (xt,0). Here, as shown in FIG. 18, the value of the angle V is a positive value when the target position (xt,0) is on the right side with respect to the center of the taken image ((x1.x2)/2,0). In addition, the value of the angle V is a negative value when the target position (xt,0) is on the left side with respect to the center of the taken image ((x1.x2)/2,0).

When the angle of the incident light at the end of the picture area is (T/2), the distance from the camera to the target is generally long enough for the shooting area, and the ratio between the length from the center of the picture area to the end and the length from the center of the picture area to the target is expressed by Equation (5). The controller 110 can obtain the target position at the position (xt,0) in the picture area from Equation (5).

$$\tan(V)/\tan(T/2) \tag{5}$$

In addition, the descriptions above show the calculating method of the target position in the horizontal direction in the picture area. Although the detailed descriptions are omitted, the target position in the vertical direction in the picture area can be similarly calculated.

As described above, after calculating the target position in the picture area, the controller 110 finds the position at which a superimposition image is to be superimposed. In this case, the controller 110 finds the position at which a superimposition image is to be superimposed such that the superimposition image is positioned at the position related to the target position in the picture area.

For example, when the superimposition image shown in FIG. 14C is handled, the position at which the superimposition image is to be superimposed (travel) is calculated such that the center position at the upper end of the superimposition image falls at the center position of the lower end of the target. However, when the target is positioned at the end of the picture area, the superimposition image is partially missing as the position at which the superimposition image is to be superimposed falls at the calculated position. In this case, for example, as shown in FIG. 14B, the superimposed position calculated is adjusted such that the superimposition image is included in the picture area.

For example, in the case of the superimposition image shown in FIG. 14C, the image is missing when the position is moved to the left. Thus, when the travel in the horizontal direction is negative, the travel in the horizontal direction is adjusted to zero.

1-11. Communication Sequence of the Control System

Figure 19:
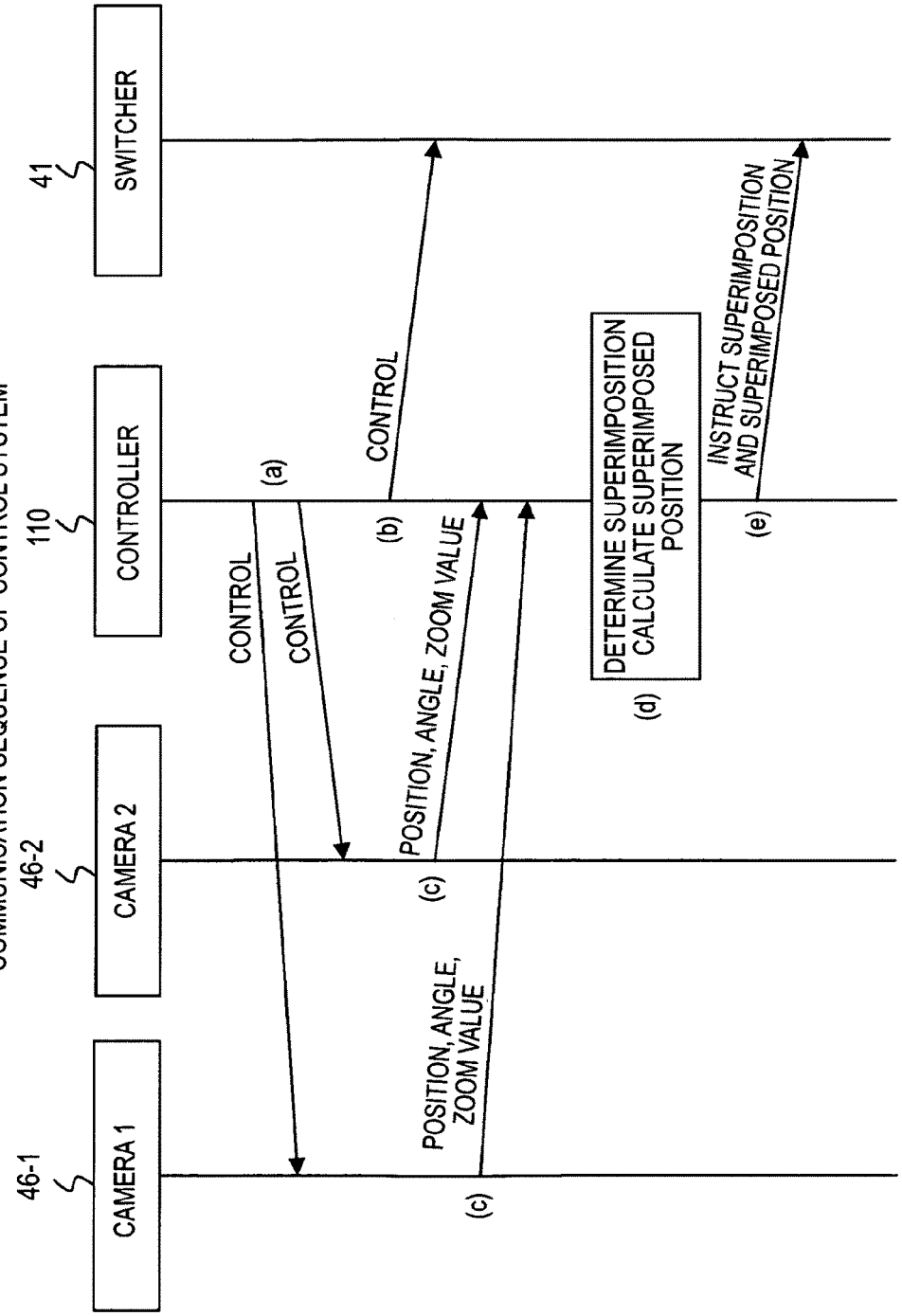
FIG. 19 is a diagram depicting an exemplary communication sequence of a control system.

Here, an exemplary communication sequence of the control system will be described when the superimposition image is to be superimposed on the image taken by the camera 46. FIG. 19 shows an exemplary communication sequence of the control system. The controller 110 controls the shooting state of each of the cameras (a). In other words, the controller 110 sends instructions of positions, the angles (directions of pan and tilt), and zoom values to the cameras 46-1 and 46-2. In addition, when the positions of the cameras 46-1 and 46-2 are fixed, the instructions of positions are omitted. In addition, the controller 110 sends an instruction to the effects switcher 41 to select an image taken by a certain camera, for example (b).

After finishing changing the position, the angle, and the zoom value, the cameras 46-1 and 46-2 send the current values of them to the controller 110 (c). In addition, for another example, the cameras 46-1 and 46-2 may not send any values, and the controller 110 may assume that the positions, the angles, and the zoom values of the cameras 46-1 and 46-2 are changed to the instructed values. In addition, for still another example, error may be returned to the controller 110 only when the cameras 46-1 and 46-2 do not follow the instructions from the controller 110.

After receiving values such as the positions, the angles, and the zoom values from the cameras 46-1 and 46-2, the controller 110 conducts determination of superimposition and calculation of the superimposed position (d). For determination of superimposition and calculation of the superimposed position, the controller 110 is configured to use the images from the cameras 46-1 and 46-2 as the background images in the effects switcher 41, and the controller 110 conducts determination of superimposition and calculation of the superimposed position when a setting is made in which the corresponding superimposition image is handled. The controller 110 determines whether the target is included in the image taken by the camera based on the position, the angle, and the zoom value from the camera corresponding to the background image. When the target is included in the image taken by the camera, the controller 110 determines that a superimposition image is to be superimposed. In addition, when the controller 110 determines that the superimposition image is to be superimposed, the controller 110 also calculates the position at which the superimposition image is to be superimposed.

After conducting determination of superimposition and calculation of the superimposed position, the controller 110 sends instructions of superimposition and the superimposed position to the effects switcher 41 (*e*).

1-12. Functional Blocks of the Controller

Figure 20:
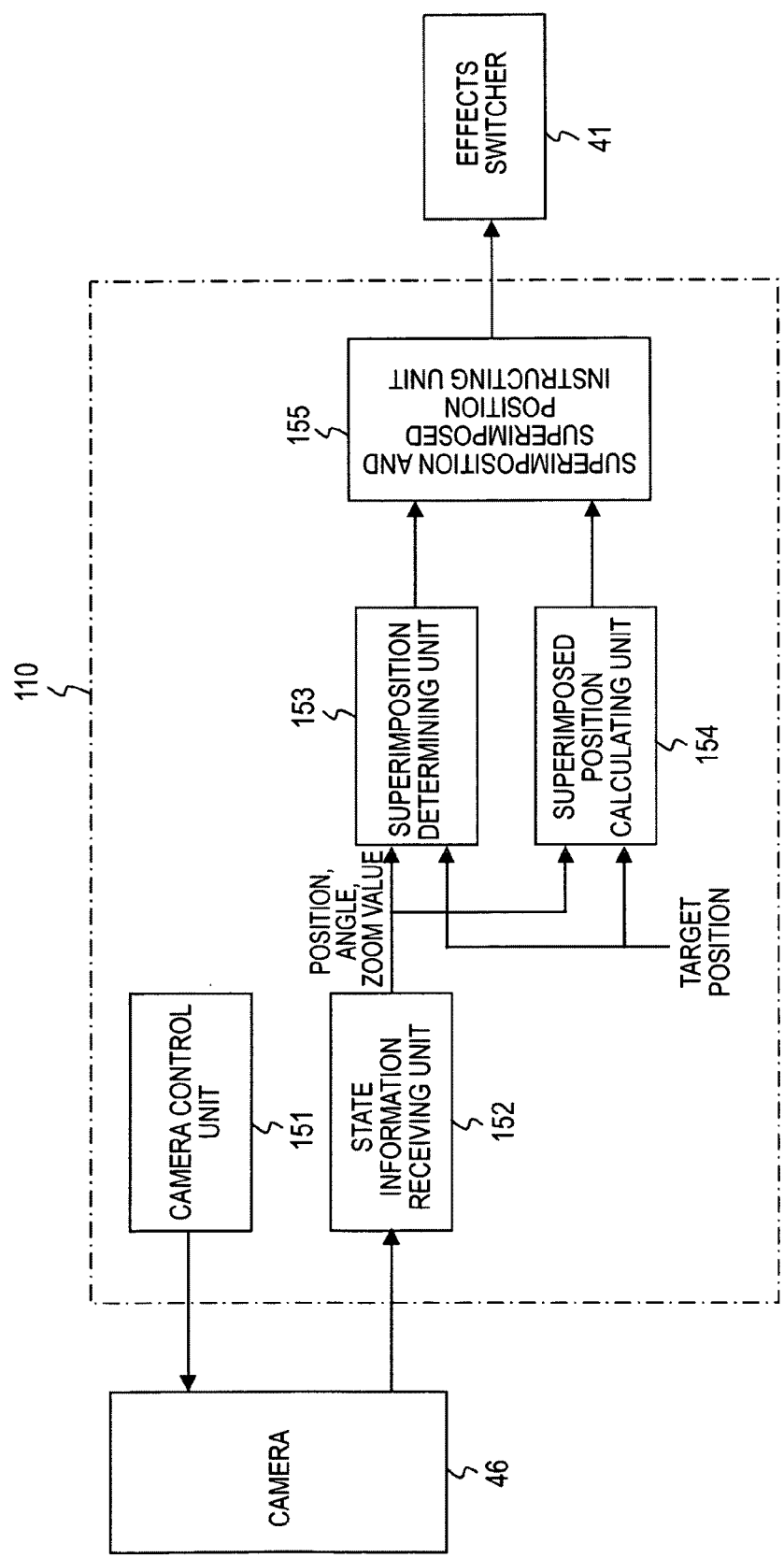
FIG. 20 is a diagram depicting an exemplary configuration of functional blocks related to superimposition control conducted by a controller.

As described above, the controller 110 controls superimposition on the image taken by the camera 46. FIG. 20 shows an exemplary configuration of the functional blocks related to superimposition control conducted by the controller 110. The controller 110 has a camera control unit 151, a state information receiving unit 152, a superimposition determining unit 153, a superimposed position calculating unit 154, and a superimposition and superimposed position instructing unit 155.

The camera control unit 151 sends to the camera 46 instructions of the position, the angle (directions of pan and tilt), and the zoom value, and controls the shooting state of the camera 46. In addition, when the position of the camera 46 is fixed, the instruction of the position is not sent. In addition, when the shooting state of the camera 46 is manually operated by the operator at the camera 46, not remotely controlled from the controller 110, the camera control unit 151 is unnecessary.

The state information receiving unit 152 receives information about the shooting state such as the position, the angle, and the zoom value sent from the camera 46. In addition, in such a system in which the camera 46 does not send information about the shooting state such as the position, the angle, and the zoom value, the state information receiving unit 152 is unnecessary. In this case, the superimposition determining unit 153 and the superimposed position calculating unit 154, described later, acquire information about the shooting state such as the position, the angle, and the zoom value from the camera control unit 151, and then use the information.

The superimposition determining unit 153 calculates the shooting area of the camera 46 based on information about the shooting state such as the position, the angle, and the zoom value and information about the target position received in the state information receiving unit 152, and determines whether the superimposition image is to be superimposed on the image taken by the camera 46 based on the calculated result. In this case, when the target (target subject) is positioned in the shooting area of the camera 46, the superimposition determining unit 153 determines to perform superimposition.

The superimposed position calculating unit 154 calculates the target position (target subject) in the picture area based on information about the shooting state such as the position, the angle, and the zoom value and information about the target position received in the state information receiving unit 152, and finds the position at which the superimposition image is to be superimposed based on the calculated result. The superimposition and superimposed position instructing unit 155 instructs the effects switcher 41 to perform superimposition based on the determined result of the superimposition determining unit 153 and the calculated result of the superimposed position calculating unit 154.

1-13. Exemplary Details of the Playlist Including Settings of Superimposition on the Target Position As described above, the controller 110 stores the playlist (cue sheet), and controls broadcast programming delivery, that is, the operations of the camera 46, the effects switcher 41, and other devices according to the playlist. In the playlist, an instruction is stored in which the effects switcher 41 is instructed to superimpose the superimposition image when the effects switcher 41 selects an image taken by the camera 46 as a background image based on information about the shooting state of the camera 46 (such as the position, the angle, and the zoom value).

FIG. 21 shows exemplary details of the playlist. The playlist includes the settings that the superimposition image is to be superimposed on the target position in the picture area. The playlist is stored in the controller 110. In the playlist, a single row shows one formation of an output image. A formation (row) is set to automatically go to the subsequent formation (row) at a predetermined time of day (elapsed time from the start), or when a Take button is manually pressed, and any one of these settings is set in the controller 110.

In the details of the individual formations shown in FIG. 21, the control state of one ME bank in the effects switcher 41 is shown as an example. The individual items will be described. Bkgd A is an input video signal selected for a bus background A (the bus that generally handles images outputted as background images). In FIG. 21, although the items are named as input video signals, it is the same to store the items according to numbers. Bkgd B is an input video signal selected for a bus background B.

Key 1 is an input video signal selected for a keyer 1. Generally, for the keyer, signals are selected for two buses, a fill bus and a source bus. In this case, typically, control is configured in such a way that a number is assigned to a pair of options, the fill and the source, and this number is used to allow single number assignments. Thus, a single number is enough here.

Key 1 Control is the details of specifying video signal processing of the keyer 1. This includes whether to lay the key (On), types of key signal processing (such as a luminous key and a chromakey), control values (such as the gain value), scaling up and down by digital image processing, and specification of modification. Key 2 and Key 2 Control are details of a keyer 2 as similar to the keyer 1.

Transition describes a changing method in changing from the previous formation to the formation. "Cut" means a cut from the previous picture, and the picture is instantaneously changed to the subsequent picture. "Wipe 3, Frames" means that a wipe of a pattern number 3 is used to change the picture for 30 frames. In addition to these, "Mix" means an effect that the picture is gradually synthesized for every pixel for switching, and a stored CG (computer graphics) is used to change the picture while the computer graphics is laid on the picture area.

In addition to those described above, the values related to the control state of the effects switcher 41 are included in one formation in the playlist.

A specification "position information 1" is sometimes included in the details of Key 1 Control (Key 2 Control). This means whether to lay the key on and position control of the superimposition image depend on position information sent from the specified camera. Position information 1 includes information (number) to specify a camera. The camera to be specified is generally the camera selected by the bus Bkgd A.

In other words, superimposition is determined from information sent from the camera shooting the background image.

In the formation including "position information 1", the effects switcher 41 is controlled as below. When the background image does not include the specified camera, the controller 110 does not conduct superimposition. On the other hand, when the background image includes the specified camera, the controller 110 determines whether the target (target subject) at the specific position (coordinates) is included in the shooting area (image frame) of the camera based on information about the shooting state (such as the position, the angle, and the zoom value) of this specified camera. When the target is included, the controller 110 further calculates the superimposed position, and instructs the effects switcher to move the superimposition image to the superimposed position with its keyer for superimposition. "Position information 2" in FIG. 21 is the same.

1-14. Exemplary Delivery Control Conducted by the Controller

Figure 22:
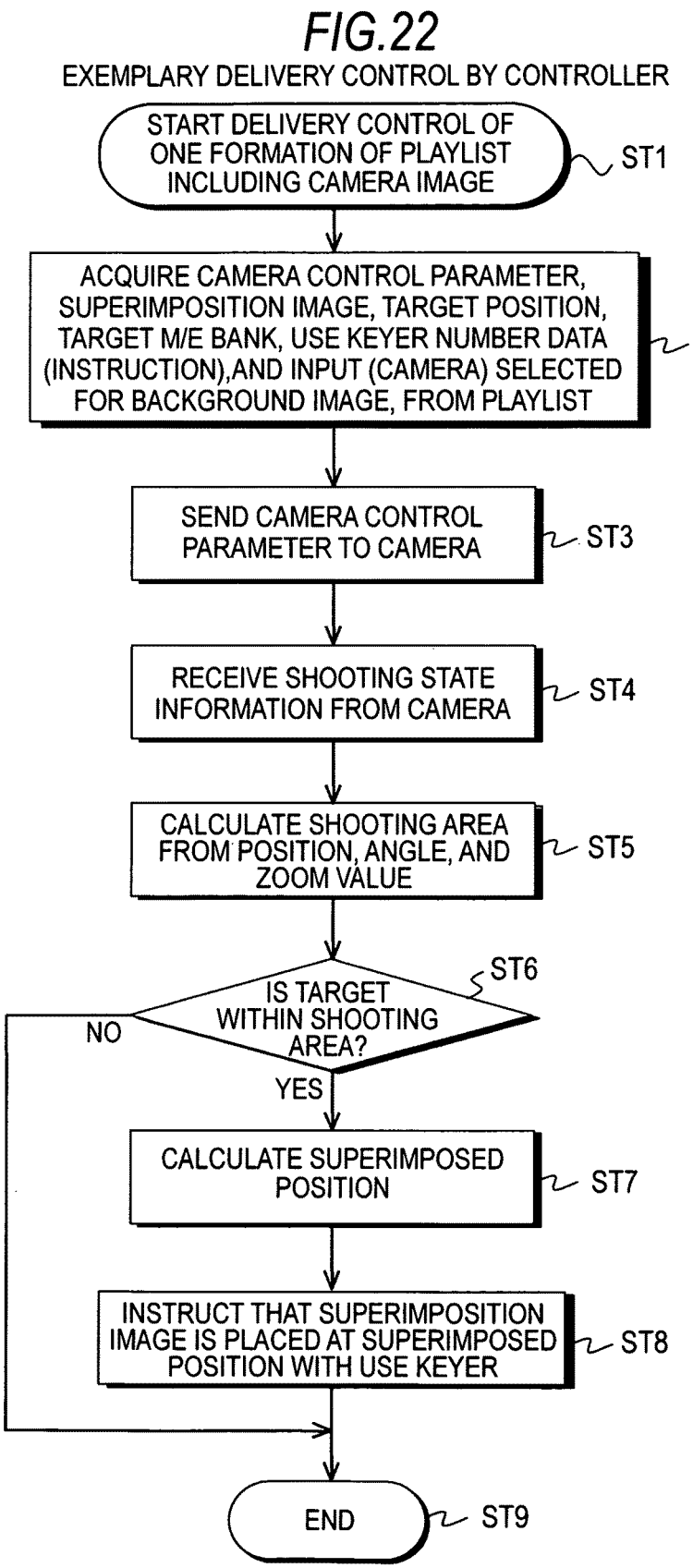
FIG. 22 is a flowchart partially depicting delivery control according to a playlist in the controller.

A flowchart shown in FIG. 22 partially depicts delivery control conducted by the controller 110 according to the playlist. In Step ST1, the controller 110 starts delivery control of one formation in the playlist including the camera image, and then goes to the process in Step ST2. In Step ST2, the controller 110 reads the individual values and the individual settings out of the formation of interest in the playlist. In this case, from the playlist, the controller 110 acquires camera control parameters, a superimposition image, a target position, a target M/E bank, data (instruction) of a use keyer number, and an input (camera) selected for a background image.

Subsequently, in Step ST3, the controller 110 sends the camera control parameters to the camera 46. Here, the camera control parameters are information to specify the shooting state of the camera 46 (such as the position, the angle, and the zoom value).

Subsequently, in Step ST4, the controller 110 receives information about the shooting state (such as the position, the angle, and the zoom value) sent from the camera 46. In Step ST5, then, the controller 110 calculates the shooting area of the camera 46 from the position, the angle, and the zoom value, and in Step ST6, the controller 110 determines whether the target is within the shooting area of the camera 46.

If the target is within the shooting area, in Step ST7, the controller 110 calculates the target position in the picture area from the position, the angle, and the zoom value, and calculates the position at which the superimposition image is to be superimposed based on the calculated result. Then, in Step ST8, the controller 110 instructs the effects switcher to place the superimposition image on the superimposed position with the use keyer.

After the process in Step ST8, the controller 110 ends delivery control for one formation in Step ST9. In addition, if the target is not within the shooting area of the camera 46 in Step ST6, the controller 110 immediately goes to Step ST9, and ends delivery control for one formation.

Figure 23:
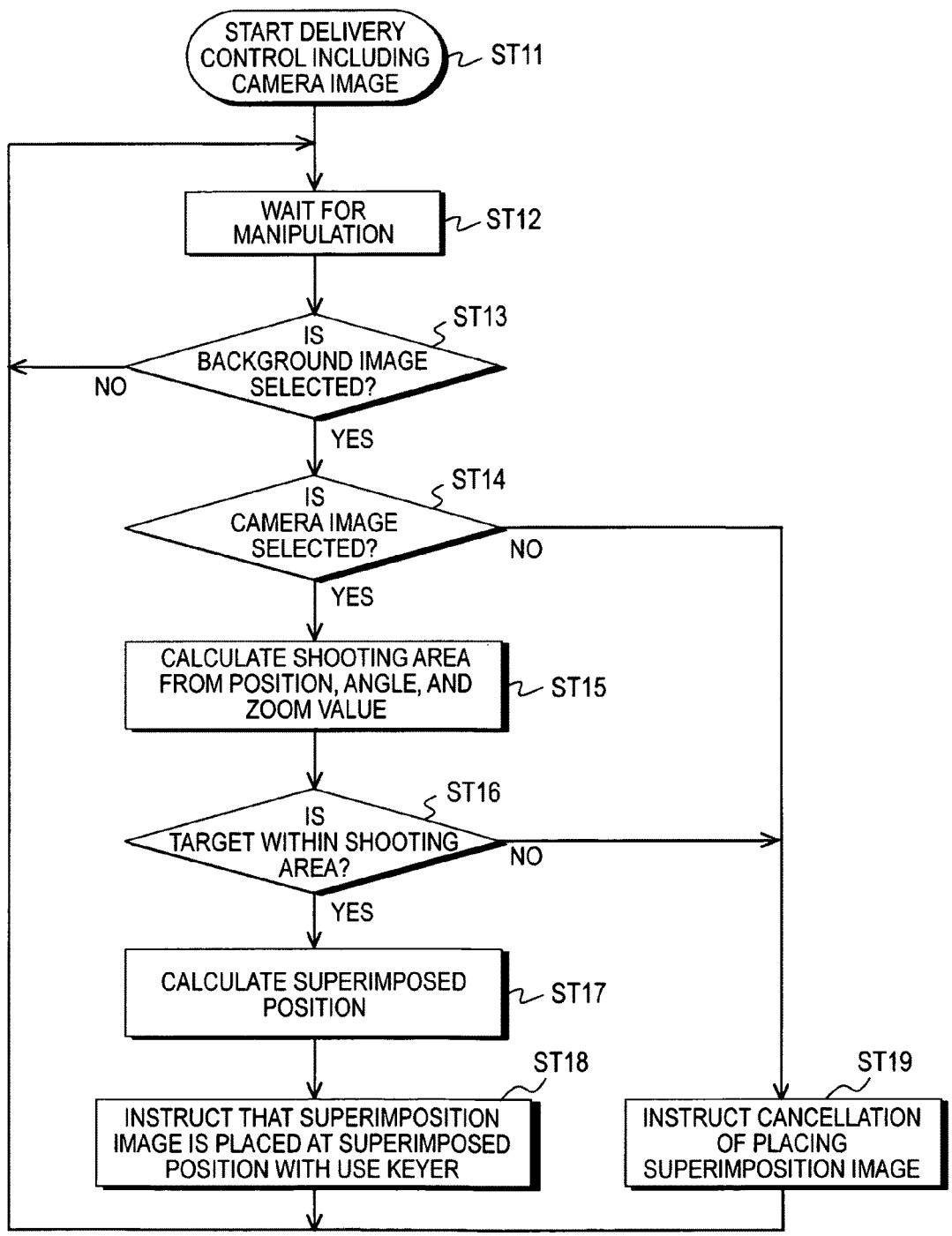
FIG. 23 is a flowchart depicting exemplary delivery control conducted by the controller in response to an operator's manual operation after finishing control for one formation in the playlist.

A flowchart shown in FIG. 23 depicts exemplary delivery control conducted by the controller 110 in response to an operator's manual operation after finishing control for one formation in the playlist. Here, manual operations may be made from the manipulation console 41A of the effects switcher 41, or may be made from the system control console 111 of the controller 110.

In Step ST11, the controller 110 starts delivery control including the camera image, and then enters the wait state for manipulation in Step ST12. If a manipulation is made in Step ST12, the controller 110 determines whether the background image is selected in Step ST13. If the background image is not selected, the controller 110 returns to Step ST12, and enters the wait state for manipulation.

If the background image is selected, in Step ST14, the controller 110 determines whether it is a manipulation to select the camera image specified in the playlist. If the specified camera image is selected, in Step ST15, the controller 110 calculates the shooting area of the camera 46 from the position, angle, and zoom value of the camera 46, and in Step ST16, the controller 110 determines whether the target is within the shooting area of the camera 46.

If the target is within the shooting area, in Step ST17, the controller 110 calculates the target position in the picture area from the position, the angle, and the zoom value, and calculates the position at which the superimposition image is to be superimposed based on the calculated result. Then, in Step ST18, the controller 110 instructs the effects switcher 41 to place the superimposition image on the superimposed position with the use keyer. After the process in Step ST18, the controller 110 returns to Step ST12, and enters the wait state for manipulation.

If the specified camera image is not selected in Step ST14, and if the target is not within the shooting area in Step ST16, in Step ST19, the controller 110 instructs the effects switcher 41 to cancel the placing of the superimposition image. After that, the controller 110 returns to Step ST12, and enters the wait state for manipulation.

In addition, because "to select the background image" is to select the background image used for outputs in the effects switcher 41, this indicates manipulations related to the background bus (Bkgd A) called a bus A. Depending on the types and settings of the effects switcher 41, this may be a bus having another name.

In the example described above, such an example is shown that a single camera is specified in one formation in the playlist. However, as another example, a plurality of cameras may be targets. When a plurality of cameras is targets, the controller 110 is configured to have information about superimposition images to be placed on a plurality of the images taken by the cameras in the playlist, or in a different storage unit.

For example, a superimposition setting table shown in FIG. 24 is set in the playlist, or in a different storage unit. The superimposition setting table is stored with the target camera number, the input number of the effects switcher 41 connected to the video signal of the target camera, and the input number of the effects switcher 41 connected to the image that is to be superimposed, for each of a plurality of the cameras. In addition, the superimposition setting table is stored with the keyer number for use, the detail to specify video signal processing of the use keyer (such as the control value), and position information (size information is sometimes included) about the target (target subject), for each of a plurality of the cameras.

In addition, when the video signals of the superimposition image is obtained from the material server, the column "the input number of the superimposition image" in the superimposition setting table shown in FIG. 24 is "the identifier of the material clip as the superimposition image", for example. In this case, in operations, which input the effects switcher 41 selects for a predetermined keyer is determined based on the correspondence between the material clip (identifier) sent from the material server and the output channel.

Figure 25:
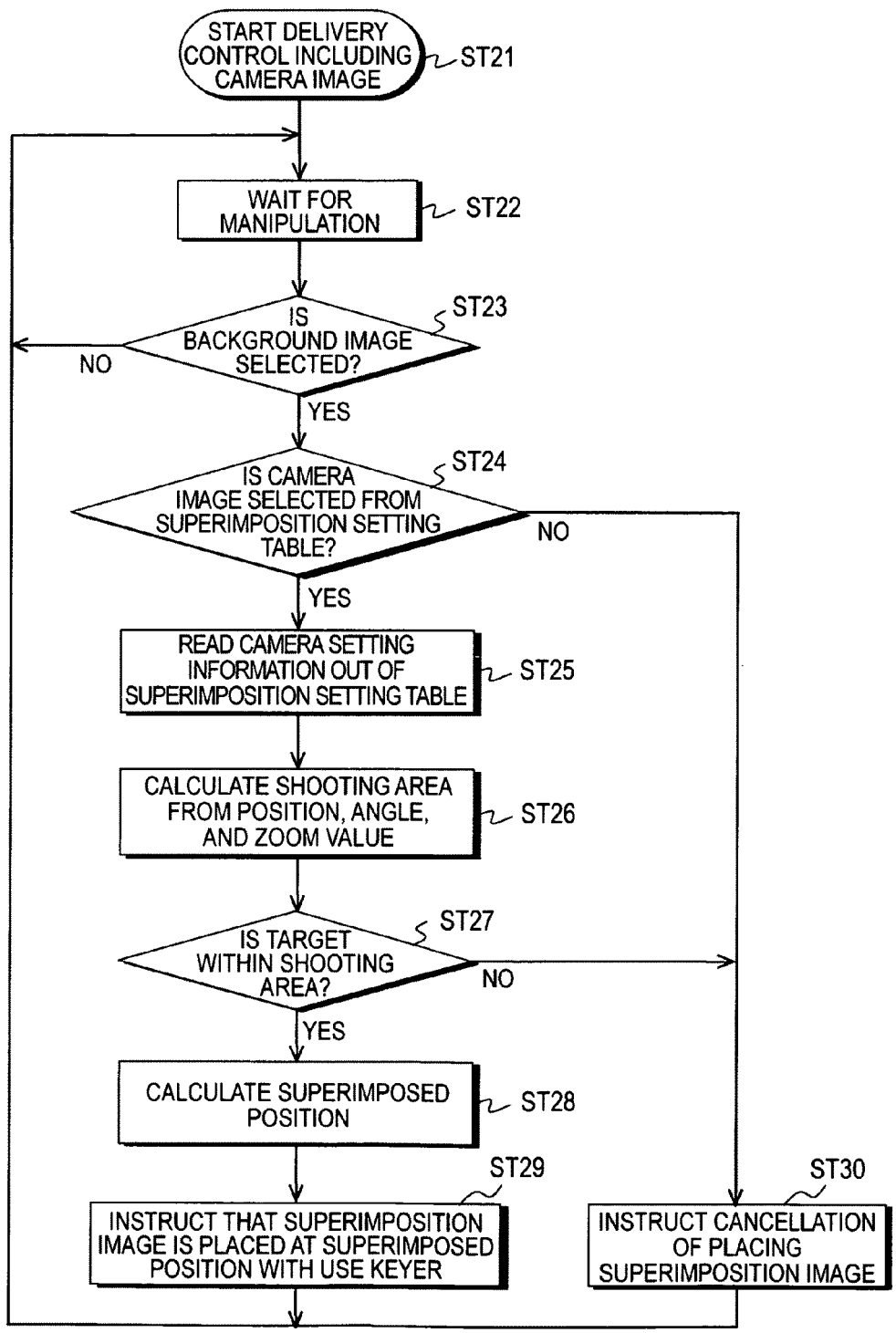
FIG. 25 is a flowchart depicting exemplary delivery control conducted by the controller in response to an operator's manual operation when the superimposition setting table is set.

A flowchart shown in FIG. 25 depicts exemplary delivery control conducted by the controller 110 in response to an operator's manual operation when the superimposition setting table is set.

In Step ST21, the controller 110 starts delivery control including the camera image, and then enters the wait state for manipulation in Step ST22. If a manipulation is made in Step ST22, the controller 110 determines whether the background image is selected in Step ST23. If the background image is not selected, the controller 110 returns to Step ST22, and enters the wait state for manipulation.

If the background image is selected, in Step ST24, the controller 110 determines whether this is a manipulation to select any one of camera images stored in the superimposition setting table. If a stored camera image is selected, in Step ST25, the controller 110 reads setting information related to the camera stored in the superimposition setting table, and prepares for use in the processes below.

Subsequently, in Step ST26, the controller 110 calculates the shooting area from the position, the angle, and the zoom value received from the camera 46, and in Step ST27, the controller 110 determines whether the target is within the shooting area of the camera 46.

If the target is within the shooting area, in Step ST28, the controller 110 calculates the target position in the picture area from the position, angle, and zoom value of the camera 46, and calculates the superimposed position at which the specified superimposition image is to be placed based on the calculated result. Then, in Step ST29, the controller 110 instructs the effects switcher 41 to place the superimposition image on the superimposed position with the specified keyer. After the process in Step ST29, the controller 110 returns to Step ST22, and enters the wait state for manipulation.

If a stored camera image is not selected from the superimposition setting table in Step ST24, and if the target is not within the shooting area in Step ST27, the controller 110 instructs the switcher 41 to cancel the placing of the superimposition image in Step ST30. After that, the controller 110 returns to Step ST22, and enters the wait state for manipulation.

In addition, in delivery control conducted by the controller 110 in FIGS. 23 and 25, preferably, control is conducted such that superimposition is conducted or cancellation of superimposition is conducted at the same timing as the timing of the operation of selecting the background image in the effects switcher 41 (the field for execution). Thus, because switching the background image and changing superimposition are performed at the same timing, an output image can be obtained with no response delay.

1-15. Delivery Control when the Shooting State of the Camera is Changed

When the shooting state such as the position, the angle (directions of pan and tilt), and the zoom value is changed in the camera 46 by manual operations, the state of the selected image taken by the camera as the background image is changed. For example, the target position is changed in the taken image. In addition, for example, the target positioned in the taken image is not positioned in the taken image. In addition, for example, the target not included in the taken image is positioned in the taken image. In the embodiment, the controller 110 is configured to change the superimposition operation conducted by the effects switcher 41 in accordance with the change in the shooting state of the camera 46.

Figure 26:
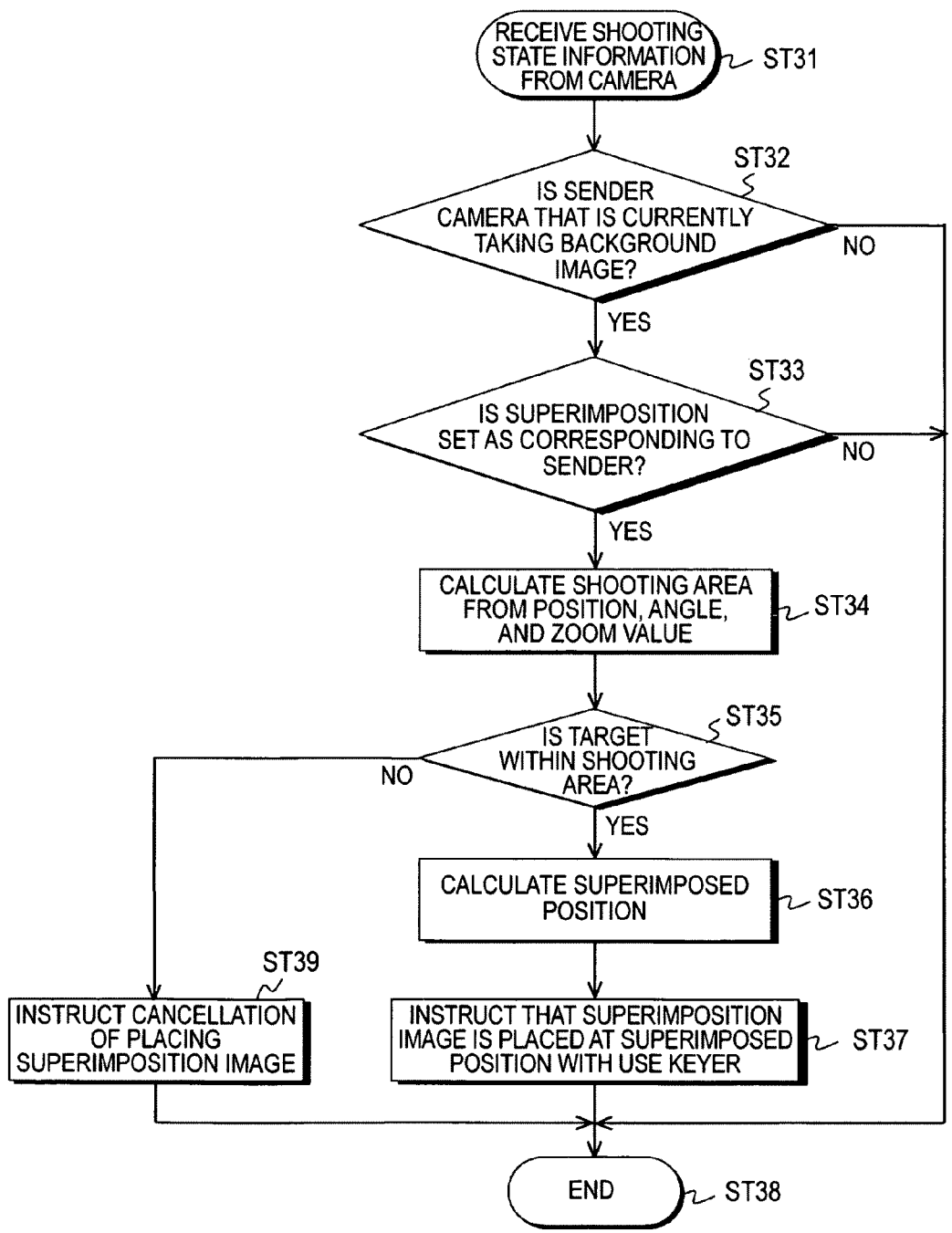
FIG. 26 is a flowchart depicting exemplary delivery control conducted by the controller when a shooting state information received from a camera in which a shooting state such as a position, an angle, and a zoom value is changed because of manual operations.

A flowchart shown in FIG. 26 depicts exemplary delivery control conducted by the controller 110 when receiving information about the shooting state from the camera in which the shooting state such as the position, the angle, and the zoom value is changed by manual operations.

In Step ST31, when receiving information about the shooting state from the camera 46, the controller 110 starts delivery control. Then, in Step ST32, the controller 110 determines whether the source of information about the shooting state is the camera 46 whose taken image is currently used for the background image. If the source of information about the shooting state is not the camera 46 whose taken image is currently used for the background image, the controller 110 immediately goes to Step ST38, and ends the control process.

If the source of information about the shooting state is the camera 46 whose taken image is currently used for the background image, the controller 110 goes to the process in Step ST33. In Step ST33, the controller 110 determines whether superimposition is set in the playlist and in the superimposition setting table as corresponding to the camera 46. If superimposition is not set, the controller 110 immediately goes to Step ST38, and ends the control process.

If superimposition is set, the controller 110 goes to the process in Step ST34. In Step ST34, the controller 110 calculates the shooting area of the camera 46 from information about the received shooting state (such as the position, the angle, and the zoom value), and in Step ST35, the controller 110 determines whether the target is within the shooting area of the camera 46.

If the target is within the shooting area, in Step ST36, the controller 110 calculates the target position in the picture area from the position, the angle, and the zoom value, and calculates the superimposed position at which the specified superimposition image is to be placed based on the calculated result. Then, in Step ST37, the controller 110 instructs the effects switcher 41 to place the superimposition image on the superimposed position with the specified keyer. After the process in Step ST37, the controller 110 ends the control process in Step ST38.

If the target is not within the shooting area in Step ST35, the controller 110 instructs the effects switcher 41 to cancel the placing of the superimposition image in Step ST39, and after that, the controller 110 goes to Step ST38, and ends the control process.

As discussed above, in the system 100 shown in FIGS. 1 and 13, when the effects switcher 41 selects an image taken by the camera 46 as a background image, the controller 110 determines whether a superimposition image is to be superimposed based on the shooting state of the camera 46. Then, based on the determined result, the controller 110 instructs the effects switcher 41 to perform superimposition.

In this case, in order to superimpose the superimposition image on the image taken by the camera 46, a portion of the circuit is not exclusively used in the effects switcher 41, a portion of the circuit is used as necessary. In addition, in this case, it is unnecessary to provide a superimposition device for cameras separately from the effects switcher 41. Therefore, superimposition according to the shooting state of the camera 46 can be economically implemented without causing degradation of the overall functions.

In addition, in the system 100 shown in FIGS. 1 and 13, when the effects switcher 41 selects an image taken by a predetermined camera 46 among a plurality of the cameras 46, it is determined whether a superimposition image is to be superimposed on the image taken by the camera 46 based on information about the shooting state of the camera 46. Then, based on the determined result, the effects switcher 41 is instructed to superimpose the superimposition image on the image taken by a predetermined camera 46. Therefore, even though a plurality of the cameras 46 is operating, suited superimposition can be economically implemented.

In addition, in the system 100 shown in FIGS. 1 and 13, the controller 110 calculates the position at which the superimposition image is to be superimposed based on information about the position, angle, and zoom value of the camera 46, and the controller 110 instructs the effects switcher 41 of the position at which the superimposition image is to be superimposed based on the calculated result. In this case, because adjusting the superimposed position of the image is automated, the staff necessary to operate a broadcasting system can be downsized to curtail costs, and the possibilities of occurrence of operating error caused by manual operations of superimposed positions can be reduced.

2. Modifications 2-1. Other Examples of the Positions at which the Superimposition Image is to be Superimposed In addition, in the embodiment described above, for the superimposition image placed on the image taken by the camera 46, the descriptions are made in which the target position (target subject) in the picture area is calculated, and the superimposition image is arranged at the lower end of the target position, for example. However, the position at which the superimposition image is to be superimposed may be fixed at a certain position in the picture area. As described above, the superimposed position is fixed to a certain position, thereby eliminating the process of finding the target position in the picture area to determine the superimposed position, and making the process easier.

Figure 27A:
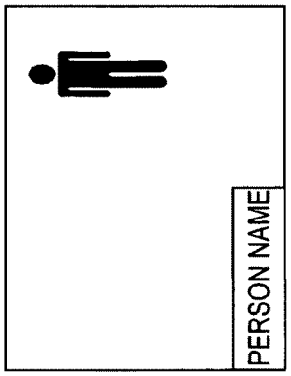
FIGS. 27A to 27I are diagrams depicting exemplary superimposed positions.
Figure 27D:
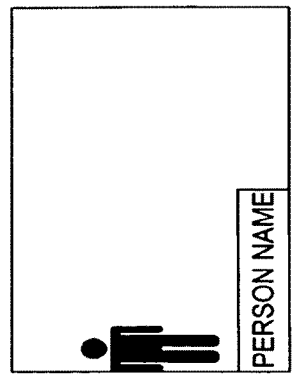
Figure 27G:
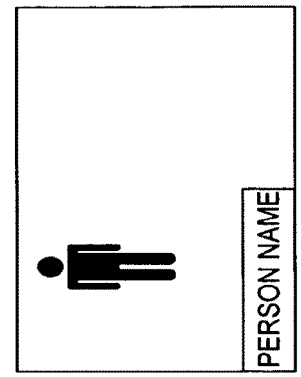
Figure 27B:
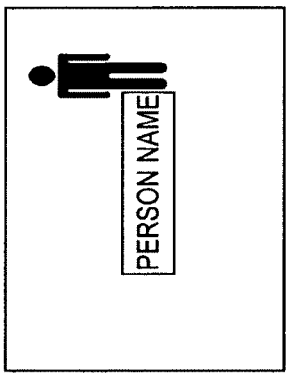
Figure 27E:
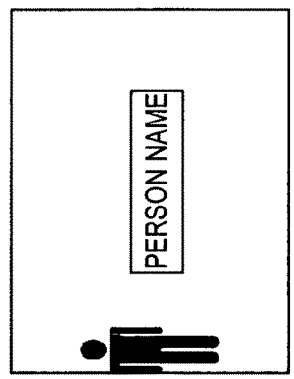
Figure 27H:
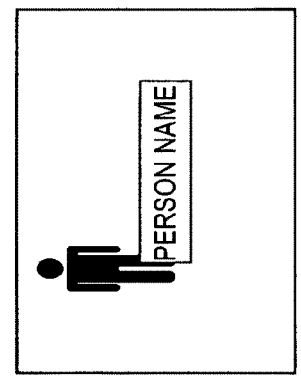
Figure 27C:
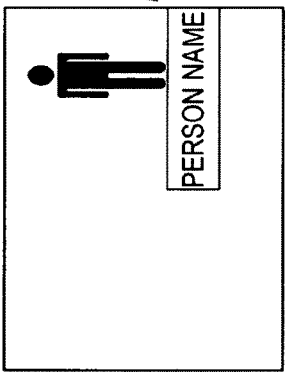
Figure 27F:
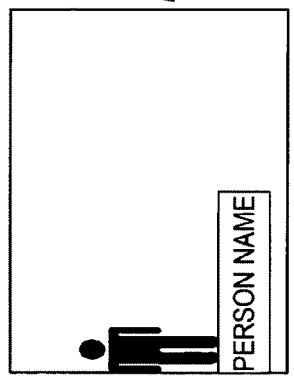
Figure 27I:
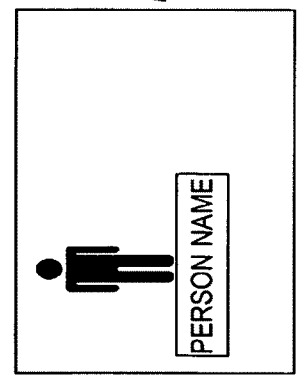

FIGS. 27A to 27I show exemplary superimposed positions. FIGS. 27A to 27C are examples that a superimposition image is arranged at the lower end of the target position. In contrast to this, FIGS. 27D to 27F are examples that a superimposition image is arranged at the center of the picture area, not depending on the target position. In addition, FIGS. 27G to 27I are examples that a superimposition image is arranged on the lower left in the picture area, not depending on the target position.

The embodiment of the invention can economically implement superimposition according to the shooting state of the camera without causing degradation of the overall functions in relation to a system using an effects switcher, which can be applied to a broadcast programming delivery control system.

It should be understood by those skilled in the art that various modifications, combinations, sub-combinations and alterations may occur depending on design requirements and other factors insofar as they are within the scope of the appended claims or the equivalents thereof.

What is claimed is:

1. A switcher control device comprising:
 a superimposition determining unit operable to determine whether a target is positioned in a shooting area of a camera,
 wherein an effects switcher is operable to select an image taken by the camera as a background image based on an angle information, a zoom value information, and the shooting area associated with the camera; and
 a switcher instructing unit operable to instruct the effects switcher to superimpose a superimposition image on the background image based on a result determined by the superimposition determining unit and a playlist, wherein the playlist comprises information associated with control of one or more switches on the effects switcher to at least superimpose the superimposition image on the background image.

2. The switcher control device according to claim 1, further comprising:
 a superimposed position calculating unit operable to calculate a position of the target in the image based on the angle information and the zoom value information associated with the camera,
 wherein the switcher instructing unit further instructs the effects switcher to superimpose the superimposition image on the background image based on the calculated position of the target.

3. The switcher control device according to claim 1,
 wherein the camera is a movable camera, and
 the superimposition determining unit calculates the shooting area based on a moved position of the camera, the angle information and the zoom value information associated with the camera.

4. The switcher control device according to claim 1, further comprising:
 a controller operable to hold information associated with a plurality of superimposition images,
 wherein the switcher instructing unit instructs the effects switcher to superimpose the plurality of superimposition images on a plurality of images taken by a plurality of cameras based on the playlist and the information associated with the plurality of superimposition images.

5. The switcher control device according to claim 1, wherein determination whether the target is positioned in the shooting area of the camera comprises determining a size of the target.

6. The switcher control device of claim 1, wherein the playlist further comprises one or more of information associated with duration of display of the superimposition image, control of one or more camera feeds from a plurality of cameras, and a set of instructions to control the effects switcher.

7. The switcher control device of claim 1, wherein the effects switcher superimposes the superimposition image when the superimposition determining unit determines that the target is positioned in the shooting area of the camera.

8. A switcher control method comprising:
 determining whether a target is positioned in a shooting area of a camera, wherein an effects switcher selects an image taken by the camera as a background image based on an angle information, a zoom value information, and the shooting area associated with the camera; and
 instructing the effects switcher to superimpose a superimposition image on the background image based on the determination and a playlist, wherein the playlist comprises information associated with control of one or more switches on the effects switcher to at least superimpose the superimposition image on the background image.

9. The switcher control method of claim 8 further comprising calculating the shooting area based on the angle information and the zoom value information.

10. An image synthesizing apparatus comprising:
 a camera;
 an effects switcher operable to synthesize an image taken by the camera; and
 a control unit operable to control an operation of the effects switcher based on a playlist comprising information associated with control of one or more switches on the effects switcher,
 wherein the effects switcher selects the image taken by the camera as a background image, the control unit determining whether a target is positioned in a shooting area of a camera, wherein the camera takes the image based on an angle information, a zoom information, and the shooting area associated with the camera, and wherein the effects switcher superimposes a superimposition image on the background image based on the determination and the playlist.

11. The image synthesizing apparatus according to claim 10,
wherein the control unit is further operable to calculate a position of the target based on the angle information and the zoom value information associated with the camera,
wherein the control unit instructs the effects switcher to superimpose the superimposition image on the background image based on the calculated position of the target.

12. The image synthesizing apparatus according to claim 10,
wherein the camera is a movable camera, and
wherein the control unit calculates the shooting area based on a moved position of the camera, the angle information and the zoom value information associated with the camera.

13. The image synthesizing apparatus according to claim 10, further comprises a plurality of cameras,
wherein the plurality of cameras take a plurality of images,
wherein the control unit holds information associated with a plurality of superimposition images that are to be superimposed on the plurality of images, and
the control unit instructing the effects switcher to superimpose the plurality of superimposition images on the plurality of images based on the playlist and the information associated with the plurality of superimposition images.

14. The image synthesizing apparatus according to claim 10,
the control unit configures a broadcast programming delivery program based on the playlist, wherein the broadcast programming delivery program is utilized for controlling the operation of the effects switcher.

* * * * *